United States Patent
Ly et al.

(10) Patent No.: US 10,425,971 B2
(45) Date of Patent: Sep. 24, 2019

(54) COLLISION REDUCTION IN CONTENTION-BASED ACCESS

(71) Applicant: QUALCOMM Incorporated, San Diego, CA (US)

(72) Inventors: Hung Ly, San Diego, CA (US); Wanshi Chen, San Diego, CA (US); Tingfang Ji, San Diego, CA (US); Hao Xu, San Diego, CA (US); Haitong Sun, San Diego, CA (US); Heechoon Lee, San Diego, CA (US); Kambiz Azarian Yazdi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 39 days.

(21) Appl. No.: 15/600,636

(22) Filed: May 19, 2017

(65) Prior Publication Data

US 2018/0124636 A1    May 3, 2018

Related U.S. Application Data

(60) Provisional application No. 62/416,628, filed on Nov. 2, 2016.

(51) Int. Cl.
*H04W 74/08* (2009.01)
*H04L 5/00* (2006.01)

(52) U.S. Cl.
CPC ....... *H04W 74/0841* (2013.01); *H04L 5/0044* (2013.01); *H04L 5/0048* (2013.01);
(Continued)

(58) Field of Classification Search
None
See application file for complete search history.

(56) References Cited

U.S. PATENT DOCUMENTS 9,326,122 B2  4/2016  Xiong et al.
9,485,060 B2  11/2016  Nayeb Nazar et al.
(Continued)

FOREIGN PATENT DOCUMENTS

WO    2014126569 A1    8/2014
WO    2016204713 A1    12/2016

OTHER PUBLICATIONS

Huawei et al., "Details of PRACH Coverage Enhancement", 3GPP Draft; R1-150034, 3rd Generation Partnership Project (3GPP), Mobile Competence Centre; 650, Route Des Lucioles; F-06921 Sophia-Anti Polls Cedex; France, vol. RAN WG1, No. Athens, Greece; Feb. 8, 2015, XP050933251, Retrieved from the Internet: URL:http://www.3gpp.org/ftp/Meetings_3GPP_SYNC/RAN1/Docs/ [retrieved on Feb. 8, 2015], 5 pages.
(Continued)

*Primary Examiner* — Saumit Shah
(74) *Attorney, Agent, or Firm* — Arent Fox, LLP

(57) ABSTRACT

A wireless communications of a contention-based access procedure that reduces collision of reference signals (e.g., when multiple devices select a same reference signal) may support a relatively high user capacity. For a contention-based access procedure, a user equipment may select at least two reference signals and transmit those at least two reference signals in association with a payload to a base station. The payload may be demodulated using each of the at least two reference signals. Thus, if collision occurs with a first reference signal of the at least two reference signals, the payload may still be demodulated using a second reference signal of the at least two reference signals. A base station may demodulate the payload using either first reference signal or the second reference signal. The base station may transmit, to the wireless communications device, a response based on the demodulated payload.

28 Claims, 14 Drawing Sheets

(52) U.S. Cl.
CPC ......... *H04W 74/085* (2013.01); *H04L 5/0007* (2013.01); *H04L 5/0062* (2013.01)

(56) References Cited

U.S. PATENT DOCUMENTS

| | | | | |
|---|---|---|---|---|
| 2012/0155274 | A1* | 6/2012 | Wang | H04L 63/1458 370/236 |
| 2015/0222402 | A1* | 8/2015 | Ouchi | H04L 1/00 370/329 |
| 2015/0326362 | A1 | 11/2015 | Xiong et al. | |
| 2017/0019886 | A1 | 1/2017 | Patel et al. | |
| 2017/0164350 | A1* | 6/2017 | Sun | H04L 5/0007 |
| 2017/0295489 | A1* | 10/2017 | Agiwal | H04W 4/70 |
| 2017/0332376 | A1* | 11/2017 | He | H04L 27/26 |
| 2018/0103465 | A1* | 4/2018 | Agiwal | H04W 72/0413 |
| 2018/0152950 | A1* | 5/2018 | Xiong | H04W 74/004 |

OTHER PUBLICATIONS

International Search Report and Written Opinion—PCT/US2017/056608—ISA/EPO—dated Jan. 11, 2018.

Qualcomm Incorporated: "DL Based Mobility UL Channels", 3GPP Draft; R1-1610169, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Oct. 9, 2016, XP051150189, Retrieved from the Internet: URL:http://www.3gpp.org/ftp/Meetings_3GPP_SYNC/RAN1/Docs/ [retrieved on Oct. 9, 2016], 3 pages.

Qualcomm Incorporated: "Single Beam RACH Design", 3GPP Draft; R1-1610163, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Oct. 1, 2016, XP051159964, Retrieved from the Internet: URL:http://www.3gpp.org/ftp/tsg_ran/WG1_RL1/TSGR1_86b/Docs/ (retrieved on Oct. 1, 2016], 3 pages.

Qualcomm Incorporated: "UL based Mobility DL Channels", 3GPP Draft; R1-1610170, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Oct. 9, 2016, XP051150190, Retrieved from the Internet: URL:http://www.3gpp.org/ftp/Meetings_3GPP_SYNC/RAN1/Docs/ [retrieved on Oct. 9, 2016], 3 pages.

Samsung: "RACH Preamble Design for NR", 3GPP Draft; R1-1609119, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Oct. 9, 2016, XP051149168, Retrieved from the Internet: URL:http://www.3gpp.org/ftp/Meetings_3GPP_SYNC/RAN1/Docs/ [retrieved on Oct. 9, 2016], 3 pages.

ZTE: "Random Access Design of NB-IoT", 3GPP Draft; R1-156628, 3rd Generation Partnership Project (3GPP), Mobile Competence Centre; 650, Route Des Lucioles; F-06921 Sophia-Anti Polls Cedex; France, vol. RAN WG1, No. Anaheim, USA; Nov. 15, 2015, XP051003030, Retrieved from the Internet: URL:http://www.3gpp.org/ftp/Meetings_3GPP_SYNC/RAN1/Docs/ (retrieved on Nov. 15, 2015], 4 pages.

\* cited by examiner

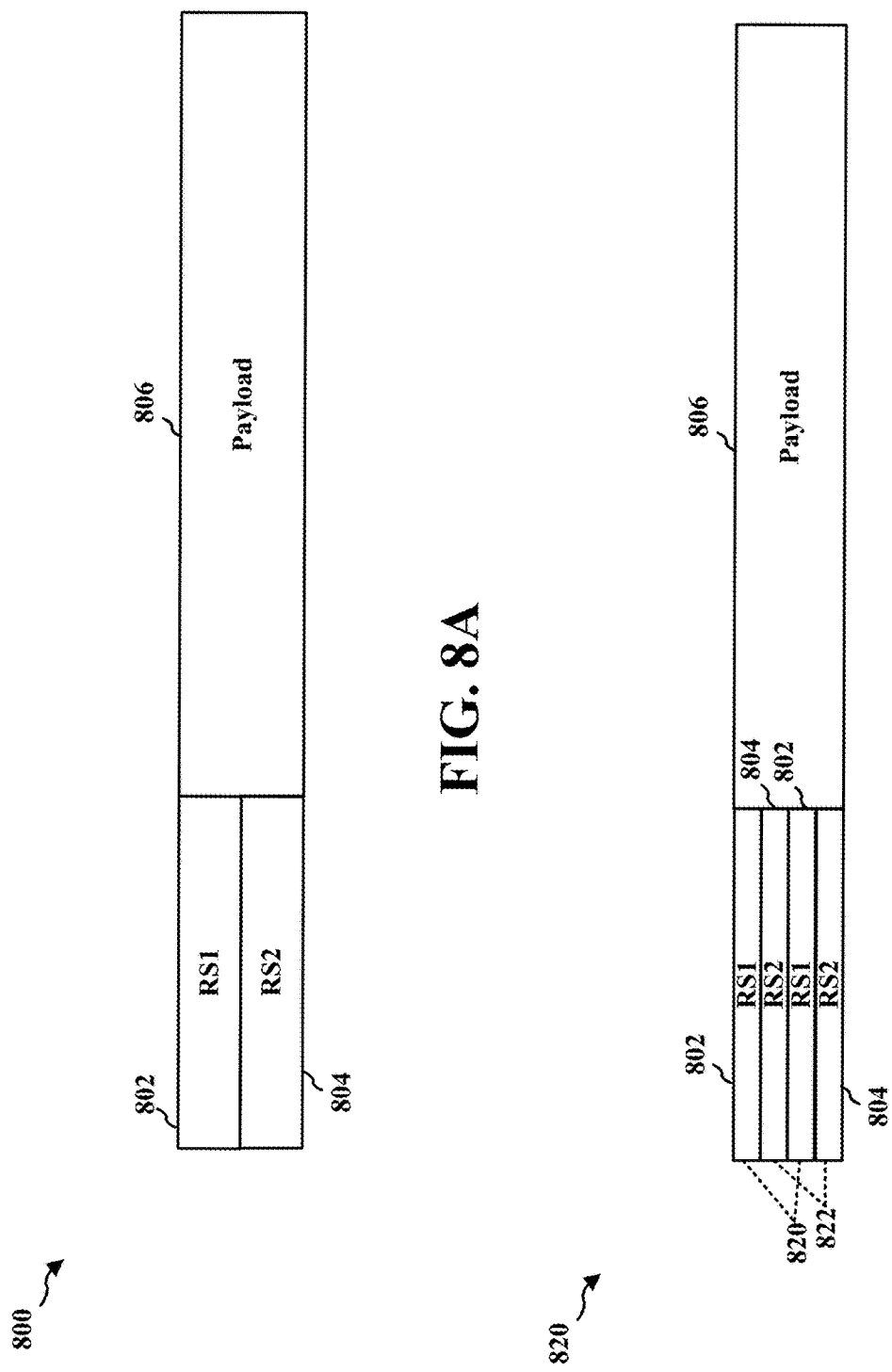

COLLISION REDUCTION IN CONTENTION-BASED ACCESS

CROSS-REFERENCE TO RELATED APPLICATION(S)

This application claims the benefit of U.S. Provisional Application Ser. No. 62/416,628, entitled "Collision Reduction in Contention-Based Access" and filed on Nov. 2, 2016, which is expressly incorporated by reference herein in its entirety.

BACKGROUND

Field

The present disclosure relates generally to communication systems, and more particularly, to a user equipment configured to determine at least two reference signals associated with a contention-based access procedure.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

In various access technologies, devices may synchronize with a network by performing a contention-based access procedure, such as a random access channel (RACH) procedure. During a contention-based access procedure, a device may transmit a reference signal, such as a RACH preamble. The number of reference signals may be fixed for a given coverage area (e.g., LTE provides sixty-four RACH preambles for a cell). When multiple devices contemporaneously attempt contention-based access procedures, the devices may select a same reference signal (e.g., a same RACH preamble). Transmission of the same reference signal may cause collision, which may lead to decoding or demodulation failure of a message (e.g., by a base station). Thus, access technologies may benefit from an approach to a contention-based access procedure that reduces the probability of demodulation failure due to collision of reference signals.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In order for a wireless communications system to support a relatively high user capacity, a wireless communications system may support a design of a contention-based access procedure that reduces collision of reference signals. (e.g., when multiple devices select a same reference signal). The present disclosure may provide an approach to reduction of collisions of reference signals transmitted during contention-based access procedures. For a contention-based access procedure, a wireless communications device may select at least two reference signals and transmit those at least two reference signals in association with a payload. The payload may be decodable using each of the at least two reference signals. Thus, if collision occurs with a first reference signal of the at least two reference signals, the payload may still be decoded using a second reference signal of the at least two reference signals. This approach may be utilized in a contention-based random access channel (RACH) procedure, for example, in which the at least two reference signals include at least two RACH preambles.

In an aspect of the disclosure, a first method, a first computer-readable medium, and a first apparatus are provided. The first apparatus may determine at least two reference signals from at least a first pool associated with available reference signals. The first apparatus may transmit an initial contention-based signal that includes the at least two reference signals and a payload. The payload can be demodulated based on a first reference signal of the at least two reference signals and can be demodulated based on a second reference signal of the at least two reference signals.

In another aspect of the disclosure, a second method, a second computer-readable medium, and a second apparatus are provided. The second apparatus may receive, from a user equipment (UE), an initial contention-based signal that includes at least two reference signals and a payload. The second apparatus may demodulate the payload based on a first reference signal of the at least two reference signals or a second reference signal of the at least two reference signals.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 8A and 8B are diagrams illustrating initial contention-based signals.

DETAILED DESCRIPTION

Figure 1:
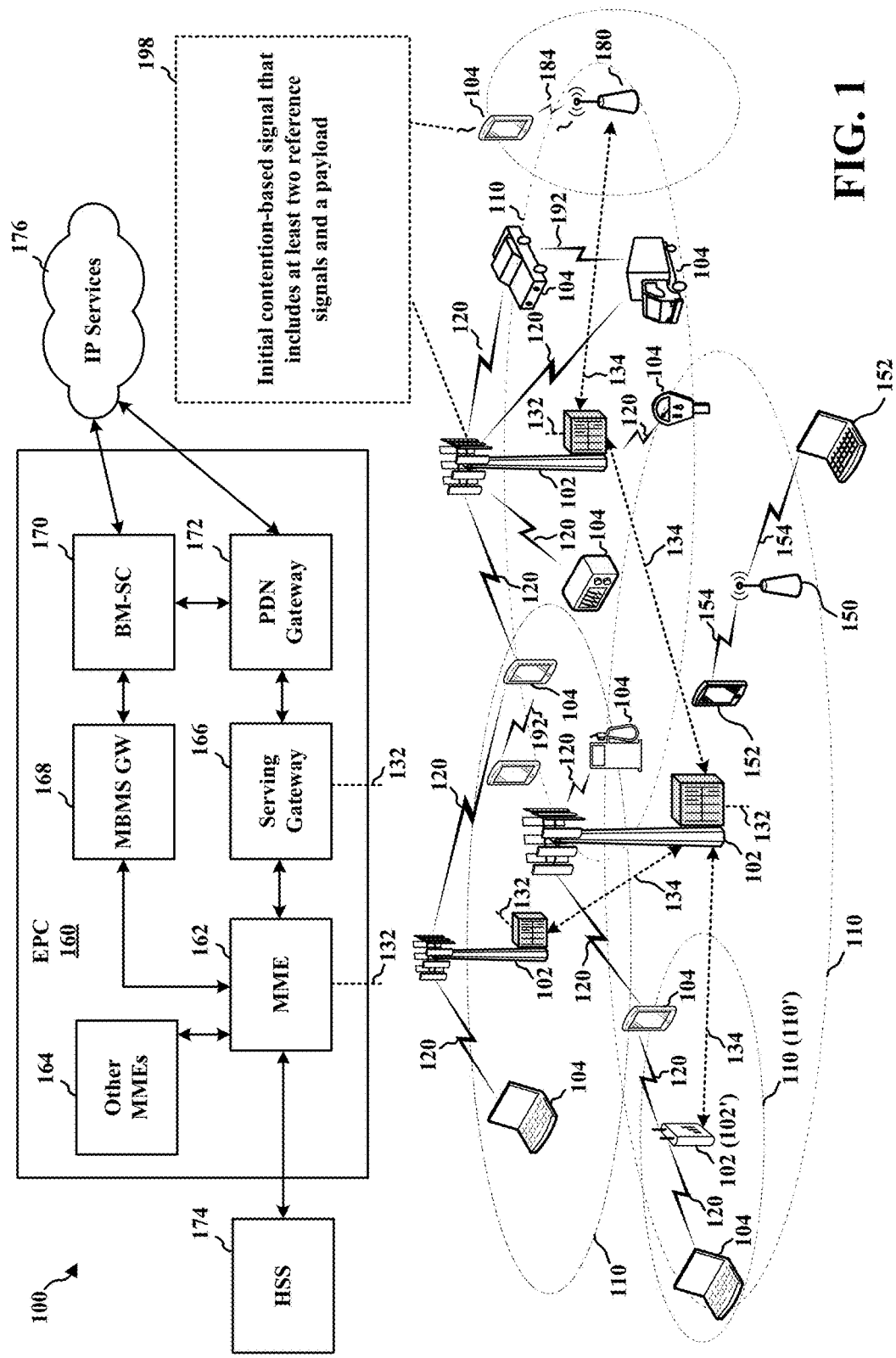
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In various access technologies, a contention-based access procedure may allow multiples wireless communications devices to use a same radio channel without some preceding coordination. In a contention-based access procedure, a reference signal may be used to differentiate a first wireless communications device from another wireless communications device. For example, a reference signal may be used to demodulate or decode a payload of a message transmitted by a wireless communications device. An example of a contention-based access procedure may be a random access channel (RACH) procedure, which a wireless communications device may perform in order to attach or synchronize to a network. In a RACH procedure, the number of RACH preambles may be fixed for a given coverage area (e.g., cell or zone). For example, LTE provides sixty-four RACH preambles for a cell (e.g., as defined by one or more 3GPP technical specifications and/or another standard). When multiple devices contemporaneously attempt a RACH procedure, the devices may select a same RACH preamble. Transmission of the same RACH preamble may cause collision, which may lead to decoding failure of a RACH message (e.g., by a base station).

In order to reduce decoding or demodulation failure due to collision of reference signals (e.g., RACH preambles) transmitted by a plurality of devices, a wireless communications device may be configured to determine at least two reference signals. The wireless communications device may transmit the at least two reference signals in association with a payload of a message (e.g., a RACH message). The payload of the message may be decoded or demodulated using each of the at least two reference signals—that is, the payload may be decoded or demodulated using a first reference signal, and the payload may also be decoded or demodulated using a second reference signal. In various aspects, the wireless communications device may have available thereto at least one pool of reference signals, and the wireless communications device may determine each of the reference signals from the at least one pool (or a first reference signal may be determined from a first pool and a second reference signal may be determined from a second pool). The wireless communications device may then transmit the at least two reference signals with the message having the payload, for example, to a base station in association with a contention-based access procedure.

As part of a contention-based access procedure, a base station may receive, from the wireless communications device, the at least two reference signals along with the message having the payload. The base station may then blindly estimate a channel when demodulating the payload of the message. For example, the base station may demodulate the payload of the message using a first reference signal of the at least two reference signals. If the base station successfully demodulates the payload using the first reference signal, then the base station may continue the contention-based access procedure with the wireless communications device (e.g., the base station may refrain from demodulating the payload using a second reference signal of the at least two reference signals because the payload has already been successfully demodulated). However, if the base station is unable to demodulate the payload using the first reference signal (e.g., due to collision of reference signals selected by multiple wireless communications devices), then the base station may attempt to demodulate the payload using a second reference signal of the at least two reference signals. If the base station successfully demodulates the payload using the second reference signal, then the base station may continue the contention-based procedure with the wireless communications device.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 192. The D2D communication link 192 may use the DL/UL WWAN spectrum. The D2D communication link 192 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may perform a contention-based access procedure with a base station 102. For example, the UE 104 may perform a random access channel (RACH) procedure with the base station 102. For the contention-based access procedure, the UE 104 may determine at least two reference signals from at least a first pool associated with available reference signals. The UE 104 may transmit an initial contention-based signal 198 that includes the at least two reference signals and a payload. The payload can be demodulated based on a first reference signal of the at least two reference signals and can be demodulated based on a second reference signal of the at least two reference signals.

During the contention-based access procedure, the base station 102 may receive, from the UE 104, the initial contention-based signal 198 that includes the at least two reference signals and the payload. The base station 102 may demodulate the payload based on the first reference signal of the at least two reference signals or the second reference signal of the at least two reference signals. If the base station 102 is able to successfully demodulate the payload using either the first reference signal or the second reference signal, then the base station 102 may transmit, to the UE 104, a response in association with the contention-based access procedure.

Figure 2:
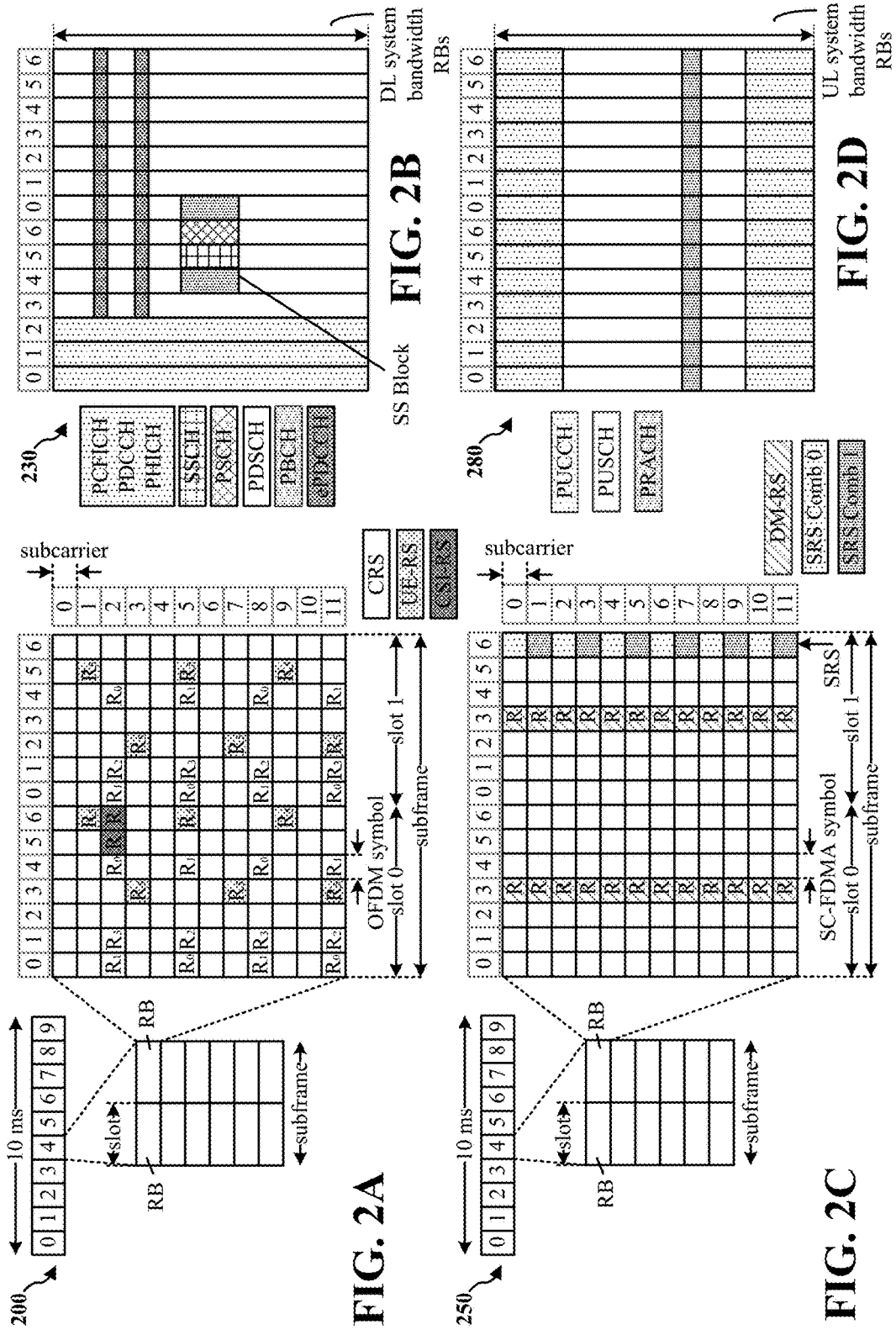
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB may contain 12 consecutive subcarriers in the frequency domain and 7 consecutive symbols (for DL, OFDM symbols; for UL, SC-FDMA symbols) in the time domain, for a total of 84 REs. For an extended cyclic prefix, an RB may contain 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R).

FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE 104 to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
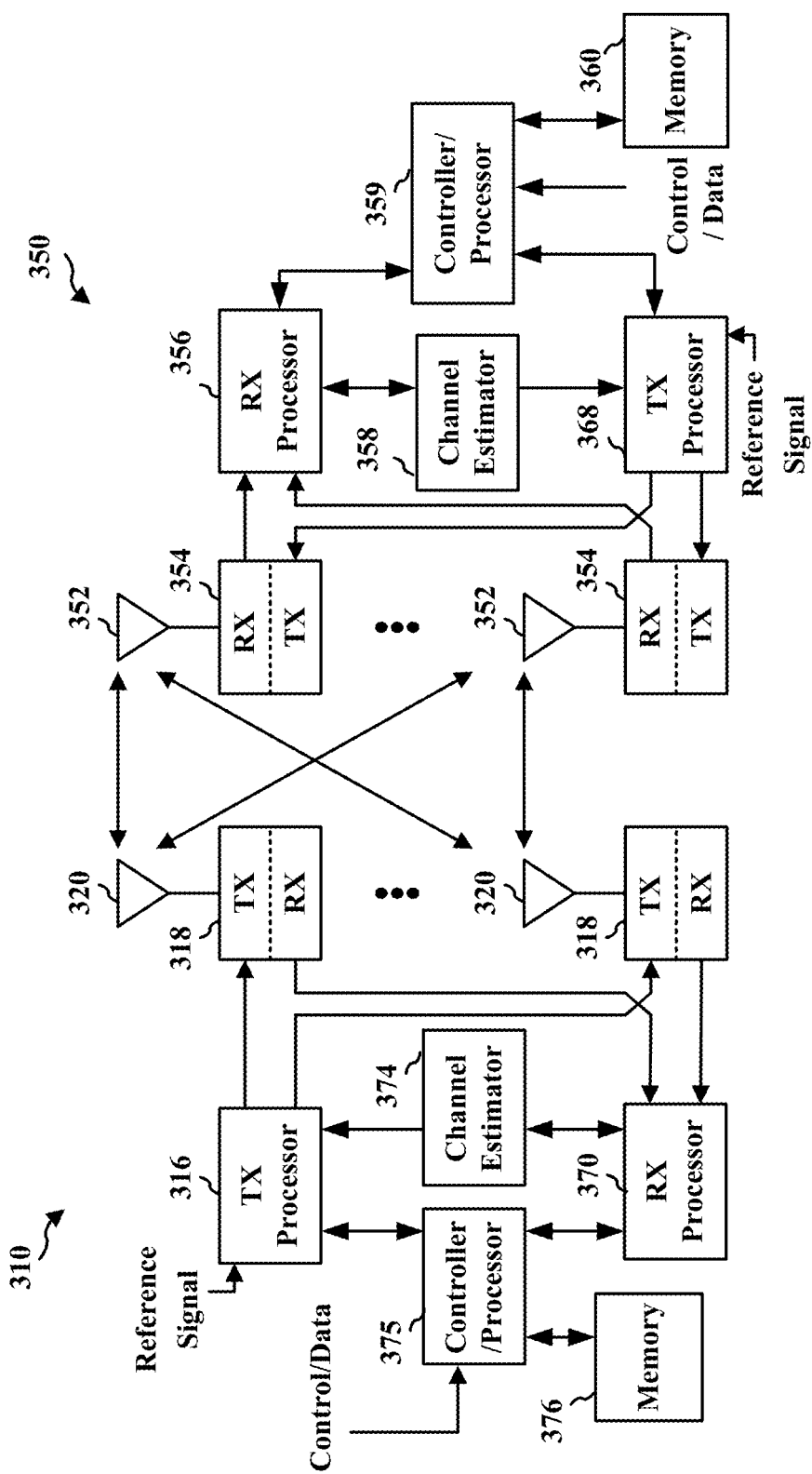
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

A UE may perform a contention-based procedure when transitioning between RRC states. For example, a contention-based procedure (e.g., RACH procedure) may be triggered in a UE when the UE transitions between one or more RRC states described with respect to FIG. 4.

Figure 5:
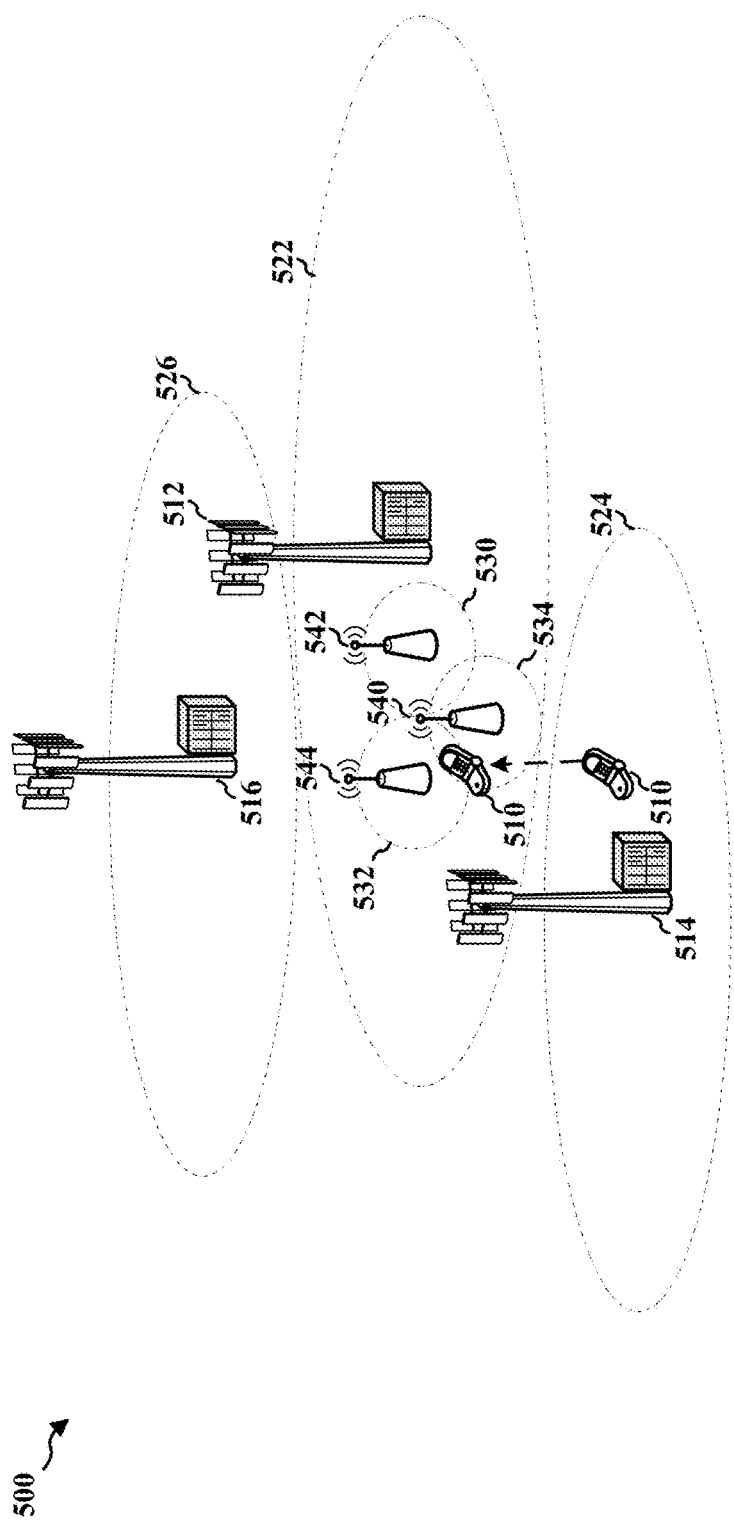
FIG. 5 is a diagram illustrating a wireless communications system.

In various aspects, a UE may perform a contention-based access procedure when operating in coverage area (e.g., cell or zone) provided by a base station (e.g., gNB or another network entity). Illustratively, FIG. 5 shows coverage areas in which a UE may operate. In various aspects, a UE may perform a contention-based procedure, for example, during uplink-based mobility (e.g., intra-zone mobility) and/or in order to elicit an on-demand SIB.

During a contention-based access procedure, a UE may determine at least two reference signals, which are to be used for demodulation of a payload of a message associated with the contention-based access procedure. The UE may transmit the at least two reference signals to a base station in association with the message. The base station may receive the at least two reference signals and the message, and may attempt to demodulate the payload of the message using at least one of the reference signals of the at least two reference signals. Various operations performed during this contention-based access procedure is described with respect to FIG. 6. In connection therewith, FIGS. 7A and 7B and FIGS. 8A and 8B may illustrate aspects of a contention-based access message that includes at least two reference signals and a payload, which may transmitted by a UE and received by a base station.

Figure 4:
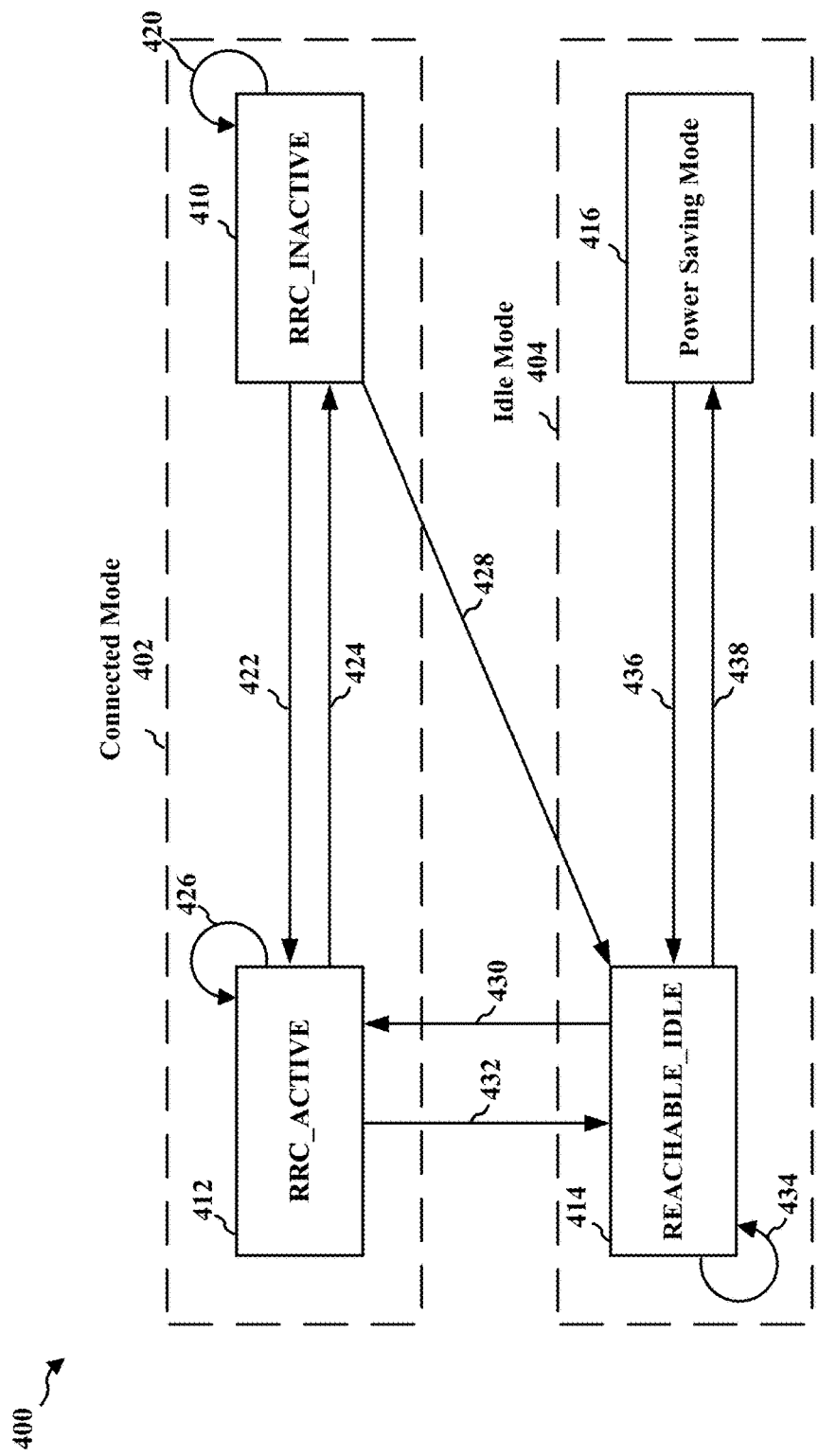
FIG. 4 is a diagram illustrating radio resource control (RRC) states.

With reference to FIG. 4, a block diagram illustrates RRC states 400 in which a UE may operate. The RRC states 400 may be applicable to NR/5G technologies. In various aspects, the UE may operate in either a connected mode 402 or an idle mode 404.

When in the connected mode 402, the UE may have an RRC connection established. When in the connected mode 402, the UE may be known to an EPC (e.g., the EPC 160), as well as a base station (e.g., the base station 102). The UE may have context in a RAN in the connected mode 402. Further, the UE may have air interface resources assigned thereto, for example, in order to schedule uplink data and receive downlink data. Thus, the UE may send and/or receive data from a network in the connected mode 402.

In contrast to the connected mode 402, the UE may operate in an idle mode 404. In the idle mode 404, the UE may not have an RRC connection established. Accordingly, the UE may not have context in the RAN. Further, the UE may not have air interface resources assigned thereto when in the idle mode 404. In aspects, the UE may transition to the idle mode 404 when the UE has no data to send and/or to receive (e.g., in order to conserve power consumed by the UE).

In the connected mode 402, the UE may operate in an RRC_Inactive state 410 or an RRC_Active state 412. In the idle mode 404, the UE may operate in a reachable_idle state 414 or a power saving mode 416.

The RRC_Inactive state 410 may be a primary "sleep" state of the UE though the UE may have an RRC connection established. The RRC_Inactive state 410 may be defined for 5G networks (e.g., according to one or more 3GPP technical specifications or another standard). In the RRC_Inactive state 410, the UE may have context in the RAN, even while in the "sleep" state. For example, the UE may be assigned at least one bearer. However, the UE may not be assigned air interface resources, but may transmit and/or receive relatively small amounts of data (e.g., a small amount of data in comparison to a threshold amount). For example, a UE may transmit and/or receive a small amount of data, and so the UE may remain 420 in the RRC_Inactive state 410 of the connected mode 402 when transmitting and/or receiving a small amount of data. By way of example, a small amount of data may include paging data from the network and/or system information (e.g., one or more SIBs).

The RRC_Active state 412 of the connected mode 402 may be a primary state for the UE to actively transmit and receive data. In the RRC_Active state 412, the UE may have context in the RAN, which be maintained when the UE is in the RRC_Inactive state 410. Additionally, the UE may be assigned air interface resources in the RRC_Active state 412. The UE may transition 422 from the RRC_Inactive state 410 to the RRC_Active state 412 when the UE has a nominal amount of data to transmit or receive (e.g., a nominal amount of data may be greater than a small amount of data). By way of example, the UE may transition 422 from the RRC_Inactive state 410 to the RRC_Active state 412 when the UE is paged by the network to receive downlink data. The UE may remain 426 in the RRC_Active state 412 for transmission and/or reception of any data. If there is a first inactivity period when the UE is in the RRC_Active state 412 of the connected mode 402, the UE may transition 424 from the RRC_Active state to the RRC_Inactive state 410. In an aspect, the first inactivity period may correspond to a first threshold duration.

From the connected mode 402, the UE may transition to the idle mode 404 from either the RRC_Active state 412 or the RRC_Inactive state 410. In an aspect, the UE may transition 428 from the RRC_Inactive state 410 to the reachable_idle state 414 when there is a second inactivity period (e.g., a period of inactivity based on a second threshold duration). In another aspect, the UE may transition 432 from the RRC_Active state 412 to the reachable_idle state 414 when there is a third inactivity period (e.g., a period of inactivity based on a third threshold duration).

In the reachable_idle state 414, the UE may not have an RRC connection established. Accordingly, the UE may lack context in the RAN. Further, the UE may not have air interface resources assigned thereto. However, in the reachable_idle state 414, the UE may transmit and/or receive a small amount of data. For example, the UE may receive paging data and/or system information (e.g., broadcast messages including configuration information). Further, the UE may perform measurements, for example, associated with neighboring cells. The UE may remain 434 in the reachable_idle state 414 when in the idle mode 404, for example, in order to transmit and/or receive a small amount of data when an RRC connection is unestablished.

When the UE has a nominal amount of data to transmit and/or receive, the UE may transition 430 from the reachable_idle state 414 of the idle mode 404 to the RRC_Active state 412 of the connected mode 402. For example, when the UE has uplink data to be scheduled for transmission (e.g., data provided by higher layers of the UE) and/or when the UE receives paging data indicating downlink data is to be scheduled for the UE, the UE may transition 430 from the reachable_idle state 414 to the RRC_Active state 412. In aspects, the UE may include a reachability timer associated with the reachable_idle state 414. The UE may begin the reachability timer when the UE is neither transmitting nor receiving a small amount of data in the reachable_idle state 414. At expiration of the reachability timer, the UE may transition 438 from the reachable_idle state 414 to the power saving mode 416.

In the power saving mode 416, the UE may neither transmit nor receive any data. The power saving mode 416 may be a "sleep" state of the UE when the UE does not have an RRC connection established. When the UE has any data to transmit and/or receive, the UE may transition 436 from the power saving mode 416 to the reachable_idle state 414. In one aspect, the duration for which the UE remains in the power saving mode 416 may be based on discontinuous reception (DRX) cycles of the UE—e.g., the UE may begin a DRX timer in the power saving mode 416 and transition 436 to the reachable_idle state at expiration of the DRX timer.

In view of the foregoing, the UE may operate in an RRC_Active state 412 and may also operate in three inactive states: the RRC_Inactive state 410, the reachable_idle state 414, and the power saving mode 416. The RRC_Inactive state 410 may be a "sleep" state for the UE in which the UE maintains an RRC connection (e.g., connected mode 402). In the reachable_idle state 414, the UE may not have an RRC connection established (e.g., idle mode 404), but may continue to transmit and/or receive a small amount of data (e.g., paging data, neighbor cell measurements, etc.). Finally, in the power saving mode 416, the UE may be in a "sleep" state in which the UE neither transmits nor receives data while the UE does not have an RRC connection established.

In various aspects, the UE may perform a contention-based access procedure, for example, based on initial access, handover, and/or uplink-based mobility. An example of a contention-based access procedure may include a RACH procedure. In one aspect, the UE may perform a RACH procedure when the UE performs initial access (e.g., when the UE is to establish an RRC connection). In such an aspect, the UE may perform a contention-based access procedure when the UE transitions 430 from the reachable_idle state 414 to the RRC_Active state 412.

According to some aspects, the UE may perform a contention-based access procedure based on downlink data (e.g., a nominal amount of data, any data, etc.) when a UE is operating in the RRC_Inactive state 410 or the idle mode 404 (e.g., the reachable_idle state 414). For example, the UE may perform a contention-based access procedure when the UE receives paging data, when the UE is scheduled to receive downlink data (e.g., pursuant to downlink assignment), or the like.

In another aspect, the UE may perform a contention-based access procedure based on uplink data (e.g., a nominal amount of data, any data, etc.) when a UE is operating in the RRC_Inactive state 410 or the idle mode 404 (e.g., the reachable_idle state 414). For example, the UE may perform a contention-based access procedure when the UE receives data from a higher layer that the UE is to schedule for transmission.

In another aspect, the UE may perform a contention-based access procedure based on a handover when the UE is operating in the connected mode 402. For example, the UE may perform a contention-based access procedure with a target cell when the UE is handed over from a serving cell to the target cell.

In another aspect, the UE may perform a contention-based access procedure based on connection reestablishment. For example, the UE may lose an RRC connection due to radio link failure, handover failure, mobility, or the like. In response, the UE may perform a contention-based access procedure in order to reestablish an RRC connection, e.g., so that the UE may transition to the connected mode 402.

According to various aspects, the UE may perform a two-step contention-based access procedure (e.g., a two-step RACH procedure). In a two-step contention-based access procedure, two messages may be communicated between the UE and the network (e.g., a base station). This two-step contention-based access procedure may be in contrast to other contention-based procedures, such as an LTE RACH procedure that requires four messages for contention-based access. The UE may perform the two-step contention-based procedure when the UE transitions 422 from the RRC_Inactive state 410 to the RRC_Active state 412 and/or when the UE is handed over while the UE remains 426 in the RRC_Active state 412.

In aspects, the UE may perform a contention-based access procedure based on uplink-based mobility. For example, when the UE is operating in the RRC_Inactive state 410, the UE may perform a contention-based access procedure during intra-zone mobility.

In another aspect, the UE may perform a contention-based procedure in order to request at least one SIB (e.g., an on-demand SIB). For example, the UE may perform an on-demand SIB procedure that includes a two-step contention-based access procedure, such as by including a bitmap indicating one or more requested SIBs in a payload of an initial contention-based message.

FIG. 5 is a diagram of a wireless communications system 500 that includes zone coverage. The wireless communications system 500 may include a plurality of zones 522, 524, 526. A base station 512, 514, 516 (e.g., a gNB or another network system) may operate a respective zone 522, 524, 526.

In an aspect, each zone 522, 524, 526 may include a set of cells, and cells within each zone 522, 524, 526 may be synchronized. For example, the first zone 522 may include a set of cells 530, 532, 534. Each of the cells 530, 532, 534 may be provided by a respective transmission reception point (TRP) 540, 542, 544, which may be or may operate similarly to a remote radio head. The TRPs 540, 542, 544 may be synchronized with one another within the first zone 522. In the illustrated aspect, the first base station 512 may communicate with the TRPs 540, 542, 544 within the first zone 522.

In an aspect, the UE 510 may operate within one or more zones, such as the first zone 522 and/or the second zone 524. In an aspect, the UE 510 may first be within the coverage area of the second zone 524, but the UE 510 may move to the coverage area of the first zone 522. In a zone, the UE 510 may be served by one or more cells, for example, in association with intra-zone mobility. For example, the UE 510 may be served by at least one of the TRPs 540, 542, 544 when in the first zone 522.

Intra-zone mobility may be transparent to the UE 510. For example, the UE 510 may be served by different TRPs 540, 542, 544 providing respective cells 530, 532, 534 based on mobility of the UE 510 within the first zone 522. For uplink-based mobility, the UE 510 may transmit (e.g., to the first base station 512) an uplink mobility reference signal (RS) for mobility tracking at the network. The uplink mobility RS may be carried on a physical uplink measurement indication channel (PUMICH). The network (e.g., via the first base station 512) may acknowledge the uplink mobility RS and/or may signal a paging indicator to the UE 510 on a physical keep-alive channel (PKACH), for example, in order to cause the UE 510 to transition to or remain in an RRC connected mode (e.g., the connected mode 402).

In an aspect, the UE 510 may perform a contention-based procedure when the UE 510 moves from the second zone 524 to the first zone 522. In another aspect, the UE 510 may perform a contention-based procedure due to intra-zone mobility, such as when the UE moves among the cells 530, 532, 534 within the first zone 522. For example, the UE 510 may be in an RRC_Inactive state (e.g., the RRC_Inactive state 410) of a connected mode (e.g., the connected mode 402), and the UE may perform a contention-based procedure when moving between the cells 530, 532, 534. In another aspect, the UE 510 may perform a contention-based procedure in order to request an on-demand SIB, for example, from the first base station 512 and/or through a TRP of the TRPs 540, 542, 544.

Figure 6:
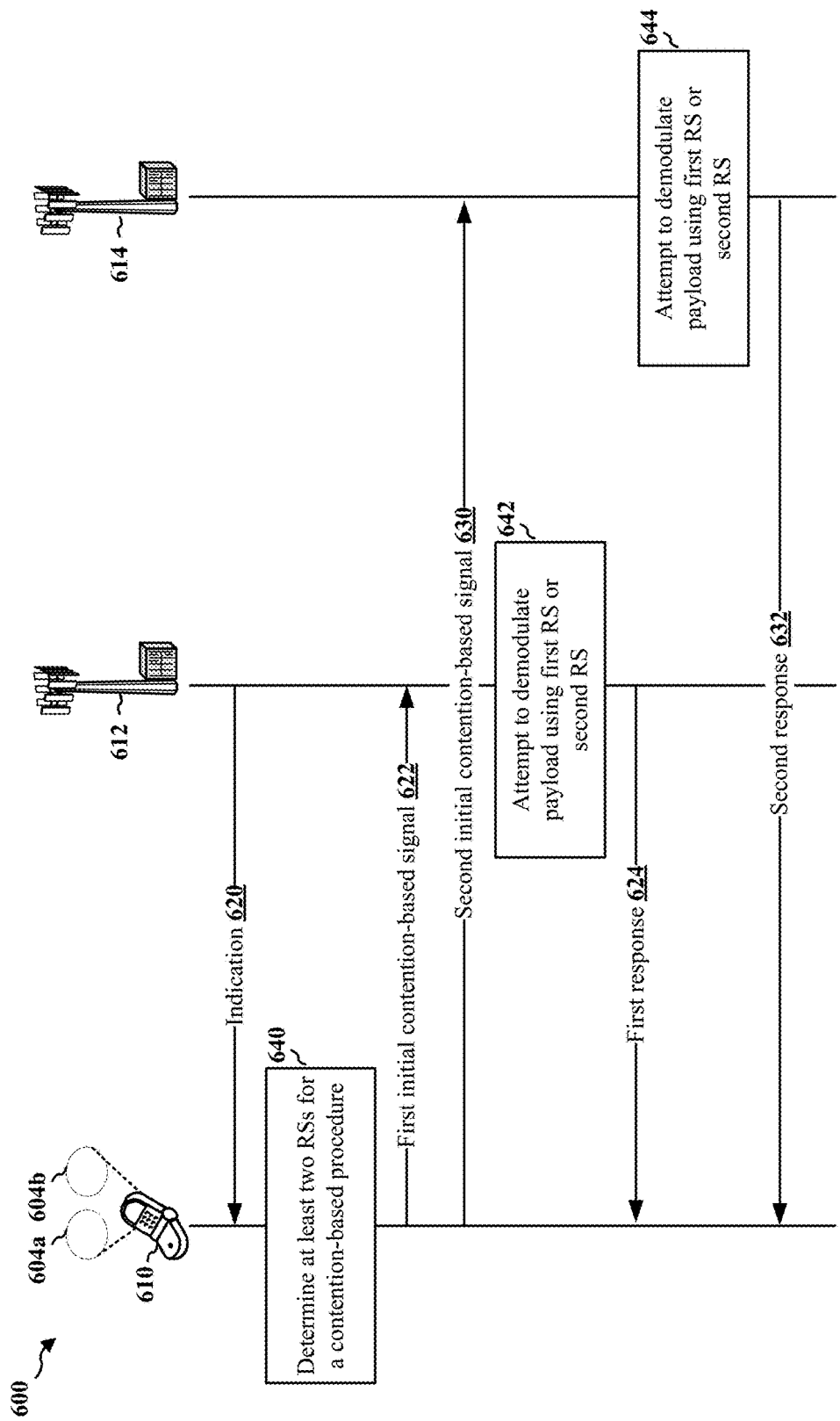
FIG. 6 is a call flow diagram illustrating a wireless communications system.

FIG. 6 is a call flow diagram of a wireless communications system 600. The wireless communications system 600 may include at least one UE 610 and one or more base stations 612, 614 (e.g., a gNB, a TRP, or another network system). In an aspect, each of the base stations 612, 614 may operate within a zone, and/or each of the base stations 612, 614 may provide a respective cell on which the UE 610 may operate. The UE 610 may perform a contention-based procedure, for example, based on mobility of the UE 610 (e.g., intra-zone mobility to one of the base stations 612, 614), to request an on-demand SIB, for connection establishment (e.g., initial access) or reestablishment, when the UE 610 is scheduled to receive data, when the UE 610 receives paging data, when the UE 610 has data to transmit to the network, when the UE 610 is handed over, or the like.

According to aspects, the UE 610 may perform a contention-based access procedure. In a contention-based access procedure, there may be a limited number of sequences, signatures, or RSs (hereinafter, RSs) for use in a zone and/or cell. For example, when the contention-based access procedure includes a RACH procedure, the number of reference signals (e.g., RACH preambles) may be limited to sixty-four for a zone and/or cell (e.g., a 3GPP technical specification or another standard may define the available RACH preambles, which be defined as sixty-four for a cell according to LTE). Consequently, collisions may occur in a contention-based access procedure—that is, collision of an RS may occur when another UE selects a same RS (e.g., RACH preamble sequence) as the UE 610 during a contention-based access procedure. A collision of RSs selected by UEs may cause demodulation to fail at the network side because payloads from the UEs may be demodulated based on the same RS.

Therefore, wireless communications systems may benefit from a contention-based procedure that is designed to reduce RS collisions. A contention-based procedure with collision reduction may support a greater number of UEs (e.g., thousands or millions of UEs) than a contention-based procedure in which one RS is used. For example, a contention-based procedure with collision reduction may facilitate successful RACH procedures to the network in a relatively short period of time (e.g., one DRX cycle that may be approximately 1.28 seconds).

In various aspects, the UE 610 may be configured to perform a contention-based procedure by transmitting multiple RSs, which may prevent demodulation failure if one RS collides with another RS transmitted by another UE. In an aspect, the UE 410 may determine to use at least two RSs based on an indication 620 received from the first base station 612, discussed infra. The UE 610 may determine 640 at least two RSs from at least one pool associated with available RSs (e.g., a pool may include a finite amount of RSs available to be used by the UE 610 for the contention-based procedure). For example, the UE 610 my select an RS from at least one pool. The RS selection from the at least one pool may be random. According to one aspect, a pool may include a plurality of preamble sequences that are to be used as RSs. In an aspect, a pool may include a plurality of values, sequences, signatures, or resources from which the UE 610 may determine (e.g., derive or select) an RS. In one aspect, a pool may be defined by a standard (e.g., a 3GPP technical specification or another standard), and may be preconfigured in the UE 610 or signaled to the UE 610 (e.g., as broadcast system information).

In an aspect, the UE 610 may determine 640 a first RS and a second RS from a same pool associated with available RSs. In another aspect, the UE 610 may determine a first RS from a first pool associated with available RSs and may determine a second RS from a second pool 604b associated with available RSs, where the first pool 604b is different from the first pool (e.g., the first pool 604b includes at least one value, sequence, signature, or resource different from the first pool).

The UE 610 may determine a payload to be carried with the at least two RSs for the contention-based procedure. The payload may vary according to different aspects. The payload can be demodulated based on the first RS and the payload can be demodulated based on the second RS. In other words, a network system (e.g., the first base station 612) can demodulate the payload based on the first RS and, separately, can demodulate the payload based on the second RS (e.g., if demodulation based on the first RS fails due to collision).

The UE 610 may multiplex the at least two RSs in a first initial contention-based signal 622. In one aspect, the UE 610 may time-division multiplex (TDM) the at least two RSs in the first initial contention-based signal 622. In another aspect, the UE 610 may frequency-division multiplex (FDM) the at least two RSs in the first initial contention-based signal 622. The UE 610 may transmit the first initial contention-based signal 622 that includes the at least two RSs and the payload.

In various aspects, an initial contention-based signal may be received by a plurality of base stations. For example, a plurality of base stations of a zone may receive an initial contention-based signal because mobility (e.g., intra-zone mobility) may be transparent to the UE 610. According to an aspect, the UE 610 may transmit the first initial contention-based signal 622 to the first base station 612 station 614. The second initial contention-based signal 630 may be the same as the first initial contention-based signal 622.

The first base station 612 may receive the first initial contention-based signal 622 that includes the at least two RSs and the payload. The first base station 612 may attempt to demodulate 642 the payload based on the first RS. If this demodulation succeeds, the first base station 612 may acquire the payload and, therefore, may not need to use the second RS. If demodulation based on the first RS fails (e.g., due to collision of the first RS), then the first base station 612 may attempt to demodulate 642 the payload based on the second RS. If the first base station 612 fails to demodulate the payload based on the first RS and based on the second RS, then the contention-based procedure may fail for the UE 610. However, inclusion of at least two RSs for demodulation may decrease the probability of failure because the probability of collisions at both the first RS and the second RS is less than the probability of a collision at a single RS.

If the first base station 612 successfully demodulates the first initial contention-based signal 622, the first base station 612 may determine a first response 624 based on the first initial contention-based signal 622. The first response 624 may vary according to different aspects. The first base station 612 may transmit the first response 624 to the UE 610 based on the first initial contention-based signal 622.

According to an aspect, the second base station 614 may perform similar operations when the UE 610 transmits the second initial contention-based signal 630 to the second base station 614. Thus, the second base station 614 may attempt to demodulate 644 the payload included in the second initial contention-based signal 630 using the first RS or, if the demodulation using the first RS fails, using the second RS. Similar to the first base station 612, the second base station 614 may determine a second response 632 based on the second initial contention-based signal 630 when the second base station 614 successfully demodulates the second initial contention-based signal 630. The second response 632 may vary according to different aspects. The second base station 614 may transmit the second response 632 to the UE 610 based on the second initial contention-based signal 630. According to one aspect, both the first base station 612 and the second base station 614 may receive the initial contention-based signals 622, 630, but the second response 632 from the second base station 614 may be absent—e.g., only the first base station 612 may transmit the first response 624 based on the first initial contention-based signal 622.

According to a first aspect, the contention-based procedure may include a two-step RACH procedure. In a two-step RACH procedure, an RS may include a RACH preamble and/or RACH mid-amble for random access and demodulation. The payload may include a RACH message indicating at least one of an identifier (ID) associated with the UE 610 (e.g., the UE-ID), a BSR, and/or a scheduling request (SR).

According to the first aspect, the first initial contention-based signal 622 may include an evolved message 1 (eMSG1) associated with the two-step RACH procedure. The UE 610 may transmit the first initial contention-based signal 622 on a physical RACH (PRACH). The second initial contention-based signal 630 may be the same as the first initial contention-based signal 622, but may be received by the second base station 614.

Further to the first aspect, the first response 624 may include an evolved message 2 (eMSG2) associated with the two-step RACH procedure. The first response 624 may include at least one of a RACH preamble ID (and/or RACH mid-amble ID), a timing advance (TA), a backoff indicator, a contention-resolution message, and/or a transmit power control (TPC). The first base station 612 may transmit the first response 624 on a PDCCH (e.g., enhanced/evolved PDCCH) and/or a PDSCH (e.g., an enhanced/evolved PDSCH).

In a second aspect, the contention-based procedure may include an on-demand SIB procedure. In an on-demand SIB procedure, the UE 610 may request specific system information, such as by requesting one or more specific SIBs. In the second aspect, an RS may include a RACH preamble. The payload may include at least one of an ID associated with the UE 610 (e.g., a UE-ID) or a request for system information. The request for system information may include a bitmap associated with a request for at least one SIB (e.g., a bitmap indicating one or more SIBs requested by the UE 610).

According to the second aspect, the first initial contention-based signal 622 may include an eMSG1 associated with the on-demand SIB procedure. The UE 610 may transmit the first initial contention-based signal 622 on a PRACH. The second initial contention-based signal 630 may be the same as the first initial contention-based signal 622, but may be received by the second base station 614.

Further to the second aspect, the first response 624 may include an eMSG2 associated with the on-demand SIB procedure. The first response 624 may include one or more SIBs based on the request for system information (e.g., one or more SIBs indicated by a bitmap included in the payload). For example, the first base station 612 may identify one or more SIBs indicated by the payload of the first initial contention-based signal 622, and the first base station 612 may generate one or more identified SIBs for transmission to the UE 610. The first base station 612 may transmit the first response 624 on a PDCCH and/or a PDSCH. Similarly, the second response 632 may include an eMSG2 associated with the on-demand SIB procedure. The second response 632 may include one or more SIBs based on the request for system information (e.g., one or more SIBs indicated by a bitmap included in the payload). The second base station 614 may transmit the second response 632 on a PDCCH and/or a PDSCH.

According to a third aspect, the contention-based procedure may include an uplink-based mobility procedure (e.g., for zone mobility that is transparent to the UE 610, such as intra-zone mobility). In the third aspect, an RS may include a RACH preamble and/or RACH mid-amble for random access and demodulation. The payload of the first initial contention-based signal 622 may include a RACH message indicating an ID associated with the UE 610 (e.g., a UE-ID). The UE 610 may transmit the first initial contention-based signal 622 on a PUMICH. The second initial contention-based signal 630 may be the same as the first initial contention-based signal 622, but may be received by the second base station 614.

Further to the third aspect, the first response 624 may include at least one of an acknowledgement associated with the first initial contention-based signal 622 carried on the PUMICH and a paging indication. The first response 624 may be one bit. The first base station 612 may transmit the first response 624 on a PKACH.

In various aspects, the UE 610 may be configured to use either one RS or more than one RS. Therefore, the UE 610 may be configured to determine whether to use at least two RSs for the initial contention-based procedure.

According to one aspect, the UE 610 may detect operating conditions associated with the network. For example, the UE 610 may determine that the UE 610 is operating in a crowded zone (e.g., the UE 610 may detect energy on resources), which may increase the probability of collisions due to many UEs contemporaneously selecting and transmitting RSs. Based on the operating conditions, the UE 610 may determine to use at least two RSs in order to reduce the probability that demodulation of the payload fails due to collision of an RS.

In another aspect, the first base station 612 may transmit an indication 620 that at least two RSs should be used for a contention-based procedure. For example, the first base station 612 may determine that a zone including the UE 610 is crowded (e.g., based on comparison of a number of UEs in the zone to a threshold) and, therefore, at least two RSs should be used to reduce the probability that demodulation of the payload fails due to collision of an RS. The indication 620 may be included in a SIB. Based on the indication 620, the UE 610 may determine to use at least two RSs for the contention-based procedure.

Figure 7A:
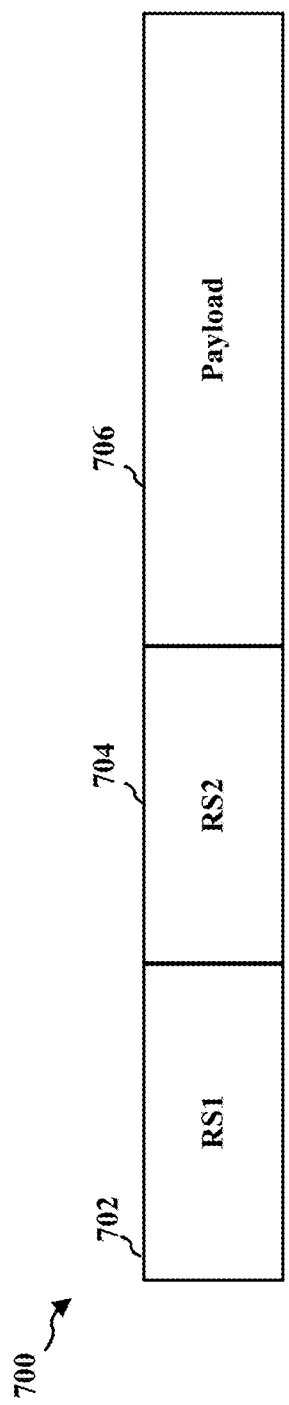
FIGS. 7A and 7B are diagrams illustrating initial contention-based signals.
Figure 7B:
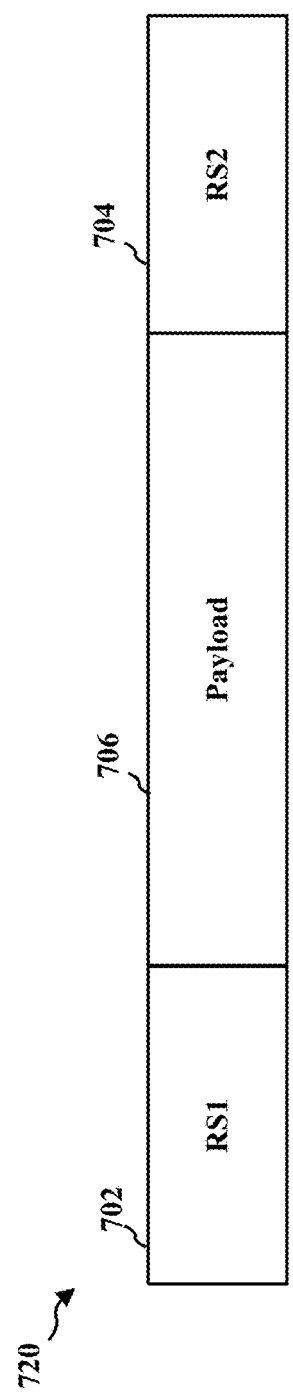

FIGS. 7A and 7B are diagrams of initial contention-based signals 700, 720, in accordance with various aspects described herein. The initial contention-based signals 700, 720 may be aspects of the first initial contention-based signal 622 and/or the second initial contention-based signal 630. The initial contention-based signals 700, 720 include at least two RSs 702, 704 and a payload 706. While FIGS. 7A and 7B illustrate two RSs 702, 704, the present disclosure comprehends aspects in which more than two RSs are included in an initial contention-based signal.

The payload 706 can be demodulated based on the first RS 702 and can be demodulated based on the second RS 704. According to various aspects, the payload 706 may include at least one of an ID associated with a UE (e.g., a UE-ID), a BSR, an SR, or a bitmap associated with a request for one or more SIB s.

In FIGS. 7A and 7B, the first RS 702 is time-division multiplexed with the second RS 704. In FIG. 7A, the first and second RSs 702, 704 are time-division multiplexed and the payload 706 is included with the time-division multiplexed RSs 702, 704 in the initial contention-based signal 700.

In FIG. 7B, the first and second RSs 702, 704 and the payload 706 are time-division multiplexed in the initial contention-based signal 700. In the exemplary aspect of FIG. 7B, the payload 706 may occur between the first RS 702 and the second RS 704 in the time domain, although other arrangements in the time domain are possible with TDM.

According to FIGS. 7A and 7B, the first and second RSs 702, 704 may have a first numerology and the payload 706 may had a second numerology. In one aspect, numerology may refer to symbol duration and subcarrier spacing in the initial contention-based signals 700, 720. The subcarrier spacing maintains subcarrier orthogonality with the subcarrier spacing equal to the inverse of the symbol duration. The numerology may depend on available resources, e.g., so that each of the initial contention-based signals 700, 720 are able to fit into an uplink slot. In an aspect, the numerology may be adjustable—e.g., symbol duration and subcarrier spacing may be adjustable.

In one aspect, the first numerology and the second numerology may be the same. For example, the first and second RSs 702, 704 may have a same numerology as the payload 706 and, therefore, the subcarrier spacing between symbols of the first and second RSs 702, 704 may be the same as the subcarrier spacing between symbols of the payload 706. For example, the numerology may refer to fifteen kilohertz (kHz) or 7.5 kHz subcarrier spacing, which may be the same across symbols of the RSs 702, 704 and the payload 706 (e.g., the payload 706 may include one or more symbols).

In another aspect, the first numerology and the second numerology may be different. For example, the first and second RSs 702, 704 have a different numerology than the payload 706 and, therefore, the subcarrier spacing between symbols of the first and second RSs 702, 704 may be different from the subcarrier spacing between symbols of the payload 706. For example, the first numerology may include fifteen kHz subcarrier spacing while the second numerology may include 7.5 kHz subcarrier spacing. Based on the difference between the first numerology and the second numerology, the total duration of the RSs 702, 704 may be approximately equal to the duration of symbols of the payload 706 (e.g., the payload may include one or more symbols).

FIGS. 8A and 8B are diagrams of initial contention-based signals 800, 820. The initial contention-based signals 800, 820 may be aspects of the first initial contention-based signal 622 and/or the second initial contention-based signal 630. The initial contention-based signals 800, 820 may include at least two RSs 802, 804 and a payload 806. While FIGS. 8A and 8B illustrates two RSs 802, 804, the present disclosure comprehends aspects in which more than two RSs are included in an initial contention-based signal.

The payload 806 can be demodulated based on the first RS 802 and can be demodulated based on the second RS 804. According to various aspects, the payload 806 may include at least one of an ID associated with a UE (e.g., a UE-ID), a BSR, an SR, or a bitmap associated with a request for one or more SIB s.

In FIGS. 8A and 8B, the first RS 802 is frequency-division multiplexed (e.g., interleaved) with the second RS 804. In an aspect, frequency-division multiplexing of the RSs 802, 804 may have a different design than RSs that are time-division multiplexed, for example, RSs that are frequency-division multiplexed may be shorter than RSs that are time-division multiplexed based on available bandwidth.

In one aspect, the RSs 802, 804 may be frequency-division multiplexed by assigning the first RS 802 to a first set of tones and assigning the second RS 804 to a second set of tones. For example, the first RS 802 may be carried on odd tones, whereas the second RS 804 may be carried on even tones.

In FIG. 8A, the RSs 802, 804 may be frequency-division multiplexed with one another. In FIG. 8B, the RSs 802, 804 may be frequency-division multiplexed when the RSs 802, 804 have comb structures 820, 822. A first comb 820 of the first RS 802 may be interleaved with a second comb 822 of the second RS 804. A UE (e.g., the UE 610) may then transmit the RSs 802, 804 on the interleaved combs 820, 822.

In various aspects, the RSs 802, 804 may be time-division multiplexed with the payload 806. In one aspect, the RSs 802, 804 may have a different numerology than the payload 806. As described with respect to FIGS. 7A and 7B, numerology may refer to subcarrier spacing in the initial contention-based signal 800. In an aspect, the numerology may be adjustable—that is, subcarrier spacing between symbols may be adjustable.

When the first and second RSs 802, 804 have a different numerology than the payload 806, the subcarrier spacing between symbols may be different. For example, the first numerology may include fifteen kHz subcarrier spacing while the second numerology may include 7.5 kHz subcarrier spacing. The RSs 802, 804 may have the first numerology and the payload 806 may have the second numerology. Based on the difference between the first numerology and the second numerology, the total duration of the RSs 802, 804 may be approximately equal to the duration of symbols of the payload 806 (e.g., the payload may include one or more symbols).

Figure 9:
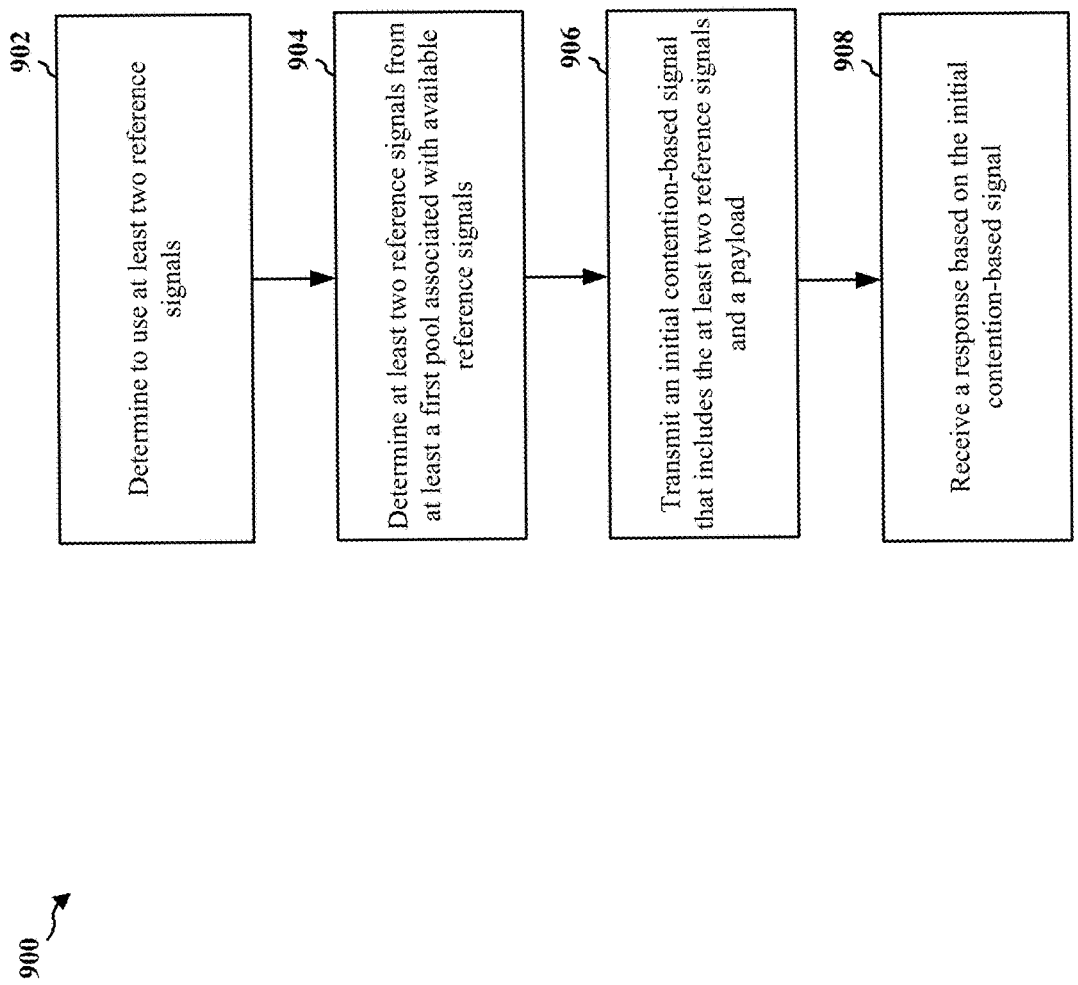
FIG. 9 is a flowchart illustrating a method of wireless communication.

FIG. 9 is a flowchart of a method 900 of wireless communication. The method 900 may be performed by a UE (e.g., the UE 610). One of ordinary skill would understand that one or more operations may be omitted, transposed, and/or contemporaneously performed.

Beginning with operation 902, the UE may determine to use at least two RSs for a contention-based procedure. According to one aspect, the UE may determine to use at least two RSs based on one or more operating conditions associated with a network (e.g., a number of UEs that are within a zone or other coverage area, a detected interference, etc.). For example, the UE may determine one or more operating conditions associated with a network on which the UE is operating, such as by determining a number of UEs within a zone or other coverage area that also includes the UE, by detecting energy on resources, and/or by detecting interference (e.g., signal-to-noise ratio (SNR), signal-to-interference-plus-noise ratio (SINR), etc.) based on reception of one or more signals intended for the UE. Based on the determination of the one or more operating conditions, the UE may determine to use one RS or may determine to use at least two RSs. According to another aspect, the UE may determine to use at least two RSs based on receiving, from a network, an indication to use at least two reference signals. For example, the UE may receive, from a base station, an indication to use one or more RSs. Based on the received indication, the UE may determine to use one RS or may determine to use at least two RSs.

In the context of FIG. 6, the UE 610 may determine to use at least two RSs for the first initial contention-based signal 622 and/or the second initial contention-based signal 630. For example, the UE 610 may determine one or more operating conditions associated with the network that includes the at least one of the base stations 612, 614, and may determine to use at least two RSs based on the determined operating conditions. In another aspect, the UE 610 may determine to use at least two RSs based on the indication 620 to use the at least two RSs received from the first base station 612.

At operation 904, the UE may determine at least two RSs from at least a first pool of RSs associated with available RSs. For example, the UE may select or generate a first RS based on at least a first pool of RSs and the UE may select or generate a second RS based on the at least the first pool of RSs or based on a second pool of RSs that is different from the first pool. In one aspect, the at least two RSs may each be a RACH preamble. In the context of FIG. 6, the UE 610 may determine 640 at least two RSs from at least a first pool 604a associated with available RSs.

In an aspect, the first pool may include a finite amount of RSs available to be used by the UE for a contention-based procedure. According to one aspect, the first pool may include a plurality of preamble sequences (e.g., RACH preamble sequences) that are to be used as RSs. According to one aspect, the first pool may include a plurality of values, sequences, signatures, or other resources from which the UE may determine (e.g., derive or generate) an RS.

In one aspect, the UE may determine a first RS from the first pool and determine the second RS from the first pool. In another aspect, the UE may determine the first RS from the first pool and, further, may determine the second RS from a second pool. The second pool may be different from the first pool—e.g., the second pool may include one or more sequences or signatures that are different from the first pool.

At operation 906, the UE may transmit an initial contention-based signal that includes the at least two RSs and a payload. The payload can be demodulated based on each RS of the at least two RSs. In an aspect, the UE may transmit the initial contention-based signal on a PUMICH or a PRACH. For example, the UE may generate an initial contention-based signal, and the UE may modulate the payload such that the payload can be demodulated using each individual RS of the at least two RSs. In the context of FIG. 6, the UE 610 may transmit, to the first base station 612, the first initial contention-based signal 622. In one aspect, the UE 610 may transmit, to the second base station 614, the second initial contention-based signal 630.

In one aspect, the UE may multiplex the at least two RSs in the initial contention-based signal. In one aspect, the UE may TDM the at least two RSs in the initial contention-based signal, for example, as illustrated by the initial contention-based signals 700, 720 of FIGS. 7A and 7B. The at least two time-division multiplexed RSs may have a first numerology and the payload may have a second numerology. In one aspect, the first and second numerologies may be the same. In another aspect, the first and second numerologies may be different.

In another aspect, the UE may FDM the at least two RSs in the initial contention-based signal. For example, a first RS of the at least two RSs may be allocated to even tones, whereas a second RS of the at least two RSs may be allocated to odd tones in the initial contention-based signal. In an aspect, the RSs may each have a comb structure and a comb associated with the first RS may be interleaved with a comb associated with the second RS. FIGS. 8A and 8B illustrate aspects of initial contention-based signals 800, 820 in which the at least two RSs 802, 804 are frequency-division multiplexed. The at least two frequency-division multiplexed RSs may have a first numerology and the payload may have a second numerology. In one aspect, the first and second numerologies may be the same. In another aspect, the first and second numerologies may be different.

In an aspect, the payload may include at least one of an ID associated with the UE (e.g., a UE-ID), an SR, a BSR, or a bitmap associated with a request for at least one SIB. For example, the UE may determine at least one of the ID, the SR, the BSR, and/or the bitmap, and may generate the initial contention-based signal to include the determined at least one of the ID, the SR, the BSR, and/or the bitmap. In one aspect, the UE may TDM the payload and the at least two RSs.

At operation 908, the UE may receive a response based on the initial contention-based signal. In one aspect, the response may be carried on a PDCCH and/or a PDSCH. In another aspect, the response may be carried on a PKACH. In one aspect, the response may include at least one of a RACH preamble ID (and/or RACH mid-amble ID), a TA, a backoff indicator, a contention-resolution message, TPC. In another aspect, the response may include at least one SIB (e.g., an on-demand SIB indicated by a request in the payload of the initial contention-based signal). In another aspect, the response may include an acknowledgement (e.g., an acknowledgement that the initial contention-based signal was received) and a paging indication. In the context of FIG. 6, the UE 610 may receive, from the first base station 612, the first response 624. In one aspect, the UE 610 may receive, from the second base station 614, the second response 632.

Figure 10:
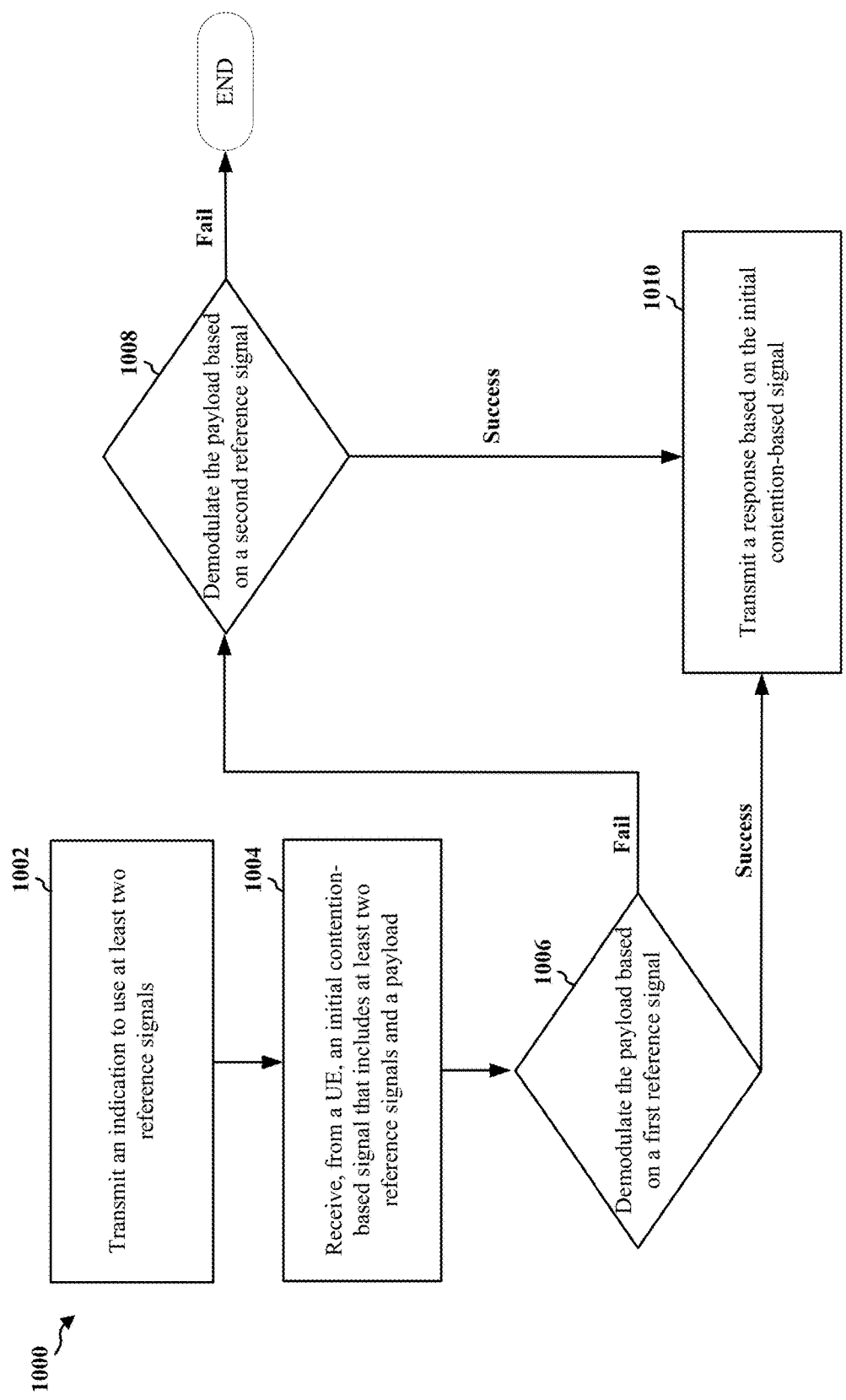
FIG. 10 is a flowchart illustrating a method of wireless communication.

FIG. 10 is a flowchart of a method 1000 of wireless communication. The method 1000 may be performed by a network system, such as a base station (e.g., the first base station 612), a TRP (e.g., the first TRP 540), a gNB, or another network system. One of ordinary skill would understand that one or more operations may be omitted, transposed, and/or contemporaneously performed.

Beginning with operation 1002, the network system may transmit an indication to use at least two RSs. The indication may be carried in a SIB. In one aspect, the network system may determine that one or more UEs are to use at least two RSs for contention-based procedures, such as by detecting one or more operating conditions associated with the network (e.g., a number of UEs that are within a zone or other coverage area of the network system, detected interference, detected energy on resources, etc.). For example, the network system may detect one or more operating conditions associated with a network on which a UE operates, such as by detecting a number of UEs that are within a zone or other coverage area associated with the network system, detecting energy on resources, and/or by detecting interference associated with one or more signals received by the network system. Based on the detected one or more operating conditions, the network system may determine whether the UE is to use at least two RSs. For example, if a number of UEs within a zone or other coverage area meets or exceeds a threshold amount, then the network system may determine that a UE is to use at least two RSs for a contention-based procedure. The network system may then transmit an indication of whether to use at least two RSs. In the context of FIG. 6, the first base station 612 may transmit the indication 620, which indicates that a UE is to use at least two RSs for a contention-based procedure.

At operation 1004, the network system may receive, from a UE, an initial contention-based signal that includes at least two RSs and a payload. The initial contention-based signal may be carried on a PUMICH or a PRACH. In one aspect, each RS of the at least two RSs may be a RACH preamble. In the context of FIG. 6, the first base station 612 may receive, from the UE 610, the first initial contention-based signal 622 that includes at least two RSs and a payload.

The network system may demultiplex the at least two RSs and the payload. In one aspect, the at least two RSs are time-division multiplexed with the payload. In one aspect, at least two RSs are frequency-division multiplexed in the initial contention-based signal. In another aspect, the at least two RSs are time-division multiplexed in the initial contention-based signal.

At operation 1006, the network system may attempt to demodulate the payload based on a first RS of the at least two RSs. For example, the network system may identify a payload of the initial contention-based signal and may identify a first RS of the at least two RSs included in the initial contention-based signal. The network system may attempt to demodulate the identified payload using the first RS. In the context of FIG. 6, the first base station 612 may attempt to demodulate 642 the payload of the first initial contention-based signal 622 based on a first RS included in the first initial contention-based signal 622.

If demodulation of the payload based on the first RS fails (e.g., due to collision of the first RS at the network system), the method 1000 may proceed to operation 1008. At operation 1008, the network system may attempt to demodulate the payload based on a second RS of the at least two RSs. For example, the network system may identify a payload of the initial contention-based signal and may identify a second RS of the at least two RSs included in the initial contention-based signal. The network system may attempt to demodulate the identified payload using the second RS. In the context of FIG. 6, the first base station 612 may attempt to demodulate 642 the payload of the first initial contention-based signal 622 based on a second RS included in the first initial contention-based signal 622.

If demodulation of the payload based on the first RS fails and demodulation of the payload based on the second RS fails (e.g., due to RS collisions for both the first RS and the second RS), the initial contention-based procedure for the UE may fail and the method 1000 may end.

If demodulation of the payload based on the first RS succeeds, the method 1000 may proceed to operation 1010. Similarly, if demodulation of the payload based on the second RS succeeds, the method 1000 may proceed to operation 1010. At operation 1010, the network system may transmit a response based on the initial contention-based signal. For example, the network system may determine information to be transmitted to the UE in response to the payload, and the network system may generate the response to include the determined information. The network system may transmit the response on a PDCCH and/or a PDSCH. In another aspect, the network system may transmit the response on a PKACH. In the context of FIG. 6, the first base station 612 may transmit, to the UE 610, the first response 624.

In one aspect, the payload may include at least one of an ID associated with the UE (e.g., a UE-ID), a BSR, an SR, or a bitmap associated with a request for at least one SIB. The network system may determine the response based on the payload. In one aspect, the network system may determine at least one of a TA, a contention-resolution message, a TCP, a backoff indicator, or a RACH preamble ID and/or RACH mid-amble ID detected from the payload (e.g., the contention-based procedure may include a two-step RACH procedure), and the network system may generate the response to include the determined at least one of the TA, the contention-resolution message, the TCP, the backoff indicator, or the detected RACH preamble ID and/or RACH mid-amble ID. In another aspect, the network system may determine at least one SIB based on a bitmap included in the payload (e.g., the contention-based procedure may include an on-demand SIB request), and the network system may generate the at least one SIB corresponding to the request indicated by the bitmap. In another aspect, the network system may determine an acknowledgement associated with the initial contention-based signal carried on the PUMICH and/or a paging indication (e.g., the contention-based procedure may include an uplink-based mobility procedure), and the network system may generate the response to include the determined acknowledgement and/or the paging indication.

Figure 11:
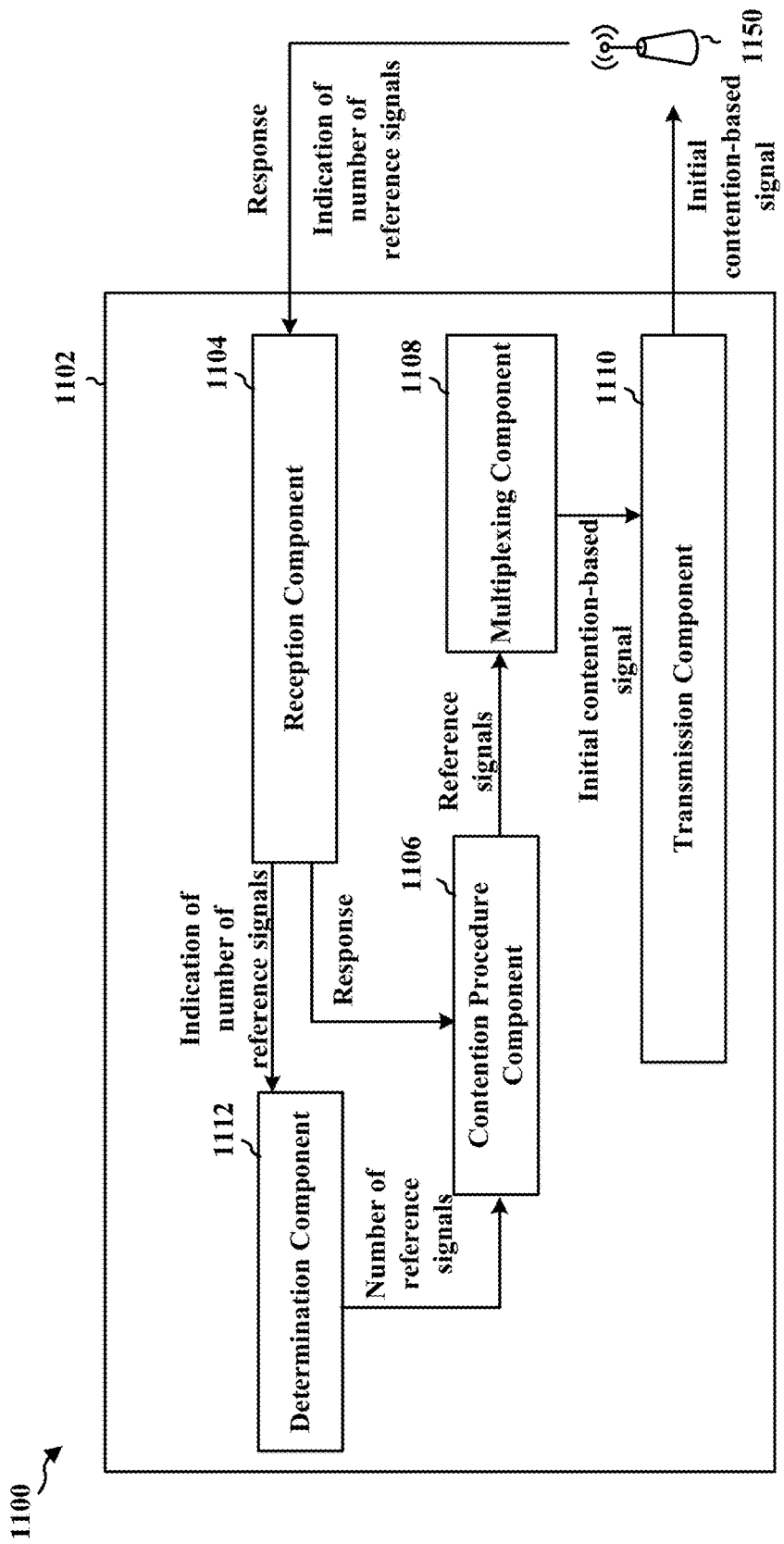
FIG. 11 is a conceptual data flow diagram illustrating the data flow between different means/components in an exemplary apparatus.

FIG. 11 is a conceptual data flow diagram 1100 illustrating the data flow between different means/components in an exemplary apparatus 1102. The apparatus may be a UE. The illustrated data flow is to be regarded as illustrative, and the apparatus 1102 may include additional/other components and/or additional/other data flow.

The apparatus 1102 may include a reception component 1104 configured to receive signals from a network system (e.g., a base station, gNB, TRP, or another network system), such as the network system 1150. The apparatus may include a transmission component 1110 configured to transmit signals to a network system (e.g., a base station, gNB, TRP, or another network system), such as the network system 1150.

In an aspect, the apparatus 1102 may include a determination component 1112. The determination component 1112 may determine to use at least two RSs for an initial contention-based procedure. The determination component 1112 may provide, to a contention procedure component 1106, an indication to use at least two RSs based on the determination to use at least two RSs.

In one aspect, the determination component 1112 may receive, from the network system 1150, through the reception component 1104, an indication of a number of RSs to use for the initial contention-based procedure, and the determination component 1112 may determine to use at least two RSs for the initial contention-based procedure based on the received indication of the number of RSs to use.

In another aspect, the determination component 1112 may determine to use the at least two RSs based on one or more operating conditions associated with a network that includes the network system 1150. For example, the determination component 1112 may determine a number of UEs within a zone or coverage area associated with the network system 1150. In another example, the determination component 1112 may detect energy on resources. In another example, the determination component 1112 may detect interference associated with signals received by the reception component 1104, such as by detecting SNR, SINR, or another measurement indicating interference. Based on the one or more determined operating conditions, the determination component 1112 may determine to use at least two RSs for the initials contention-based procedure.

The contention procedure component 1106 may determine at least two RSs from at least a first pool associated with available RSs. The contention procedure component 1106 may determine the at least two RSs based on an indication to use at least two RSs provided by the determination component 1112. In an aspect, the contention procedure component 1106 may determine the at least two RSs from a first pool associated with available RSs. In another aspect, the contention procedure component 1106 may determine a first RS from the first pool and may determine a second RS from a second pool associated with available RSs (e.g., the second pool may be different from the first pool).

In one aspect, the contention procedure component 1106 may determine the first RS to include a first RACH preamble and may determine the second RS to include a second RACH preamble. In an aspect, the first pool may include a plurality of preamble sequences. If the contention procedure component 1106 determines the second RS from a second pool, the second pool may include a plurality of preamble sequences, at least one of which is absent from the first pool.

In an aspect, the contention procedure component 1106 may determine a payload to be included in an initial-contention based signal. The contention procedure component 1106 may determine at least one of an ID associated with the apparatus 1102, an SR, a BSR, and/or a bitmap associated with a request for at least one SIB. The contention procedure component 1106 may determine the payload to include the at least one of the determined ID, SR, BSR, and/or bitmap. In an aspect, the payload can be demodulated based on a first RS of the at least two RSs and can be demodulated based on a second RS of the at least two RSs.

The contention procedure component 1106 may provide the RSs to a multiplexing component 1108. The contention procedure component 1106 may further provide the payload to the multiplexing component 1108.

The multiplexing component 1108 may be configured to multiplex the at least two RSs in an initial contention-based signal. Further, the multiplexing component 1108 may multiplex the payload with the multiplexed RSs. For example, the multiplexing component 1108 may TDM the payload with the multiplexed RSs. The multiplexing component 1108 may provide the multiplexed RSs and payload to the transmission component 1110, such as by providing, to the transmission component 1110, an initial contention-based signal that includes the multiplexed at least two RSs multiplexed with the payload.

In one aspect, the multiplexing component 1108 may TDM the at least two RSs in the initial contention-based signal. In one aspect, multiplexing component 1108 may determine at least one numerology for the RSs. The multiplexing component 1108 may cause the at least two time-division multiplexed RSs to have a first numerology in the initial contention-based signal, and the multiplexing component 1108 may cause the payload to have a second numerology in the initial contention-based signal. In one aspect, the first numerology may be equal to the second numerology.

In one aspect, the multiplexing component 1108 may FDM the at least two RSs in the initial contention-based signal. In an aspect, a first RS of the at least two RSs may be allocated to even tones, while a second RS of the at least two RSs may be allocated to odd tones. In one aspect, the multiplexing component 1108 may interleave a first comb associated with a first RS of the at least two RSs with a second comb associated with a second RS of the at least two RSs.

The transmission component 1110 may transmit the initial contention-based signal to the network system 1150. In one aspect, the transmission component 1110 may transmit the initial contention-based signal on a PUMICH or a PRACH.

Based on the on the initial contention-based signal, the reception component 1104 may receive a response. The reception component 1104 may provide the received response to the contention procedure component 1106.

The apparatus may include additional components that perform each of the blocks of the algorithm in the aforementioned flowchart of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 12:
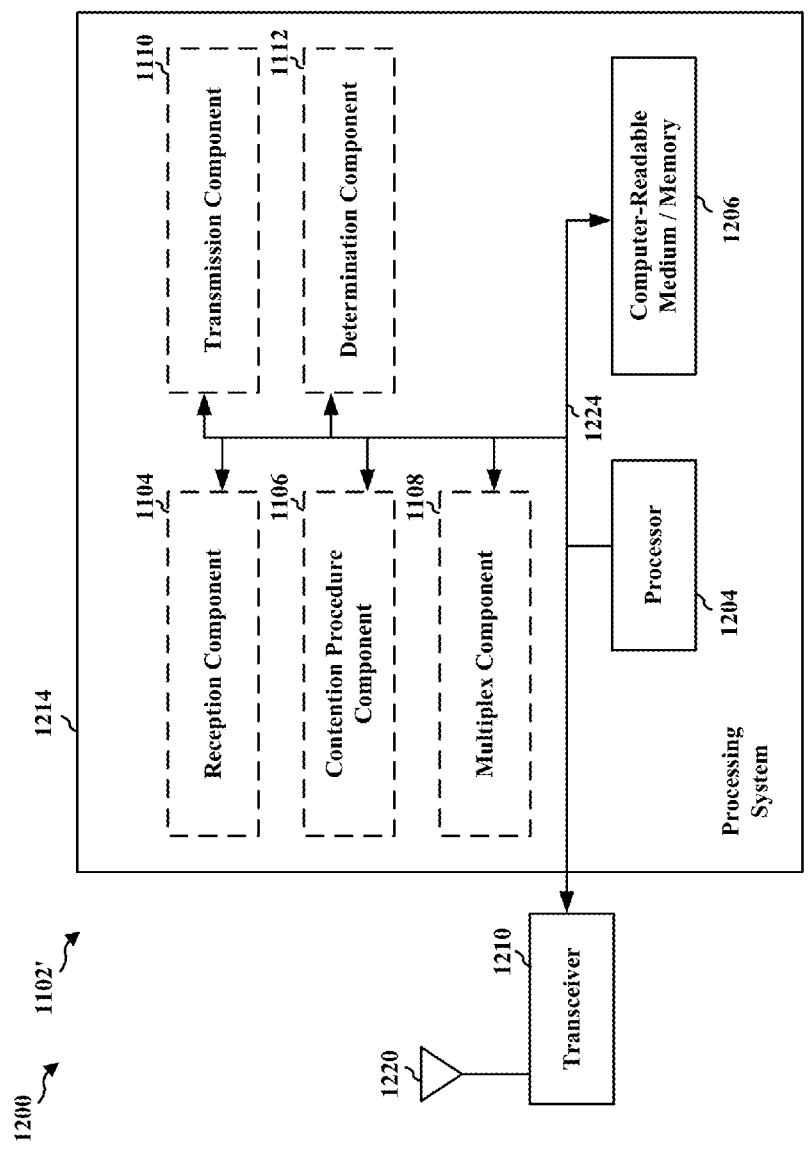
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware components, represented by the processor 1204, the components 1104, 1106, 1108, 1110, 1112 and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the reception component 1104. In addition, the transceiver 1210 receives information from the processing system 1214, specifically the transmission component 1110, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system 1214 further includes at least one of the components 1104, 1106, 1108, 1110, 1112. The components may be software components running in the processor 1204, resident/stored in the computer readable medium/memory 1206, one or more hardware components coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for determining at least two reference signals from at least a first pool associated with available reference signals. The apparatus 1202/1202' may include means for transmitting an initial contention-based signal that includes the at least two reference signals and a payload, wherein the payload can be demodulated based on a first reference signal of the at least two reference signals and can be demodulated based on a second reference signal of the at least two reference signals.

In one aspect, both the first reference signal and the second reference signal are determined from the first pool. In an aspect, the first reference signal is determined from the first pool and the second reference signal is determined from a second pool associated with available reference signals. In an aspect, the first reference signal comprises a first RACH preamble and the second reference signal comprises a second RACH preamble, and wherein the first pool comprises a plurality of preamble sequences. In an aspect, the initial contention-based signal is carried on a PUMICH or a PRACH.

In an aspect, the at least two reference signals are time-division multiplexed in the initial contention-based signal. In an aspect, the at least two time-division multiplexed reference signals have a first numerology and the payload has a second numerology, and wherein numerology refers to subcarrier spacing in the initial contention-based signal. In an aspect, the first numerology is equal to the second numerology or the first numerology is different from the second numerology.

In an aspect, the at least two reference signals are frequency-division multiplexed in the initial contention-based signal. In an aspect, a first comb associated with first reference signal is interleaved with a second comb associated with the second reference signal.

The apparatus 1102/1102' may include means for determining to use the at least two reference signals for the initial contention-based signal. In an aspect, the means for determining to use the at least two reference signals is configured to receive, from a network, an indication to use the at least two reference signals. In an aspect, the determination to use the at least two reference signals is based on one or more operating conditions associated with a network. In an aspect, the apparatus 1102/1102' may include means for receiving a response based on the initial contention-based signal.

In one aspect, the payload includes at least one of an ID associated with the apparatus 1102/1102', an SR, a BSR, or a bitmap associated with a request for at least one SIB.

The aforementioned means may be one or more of the aforementioned components of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
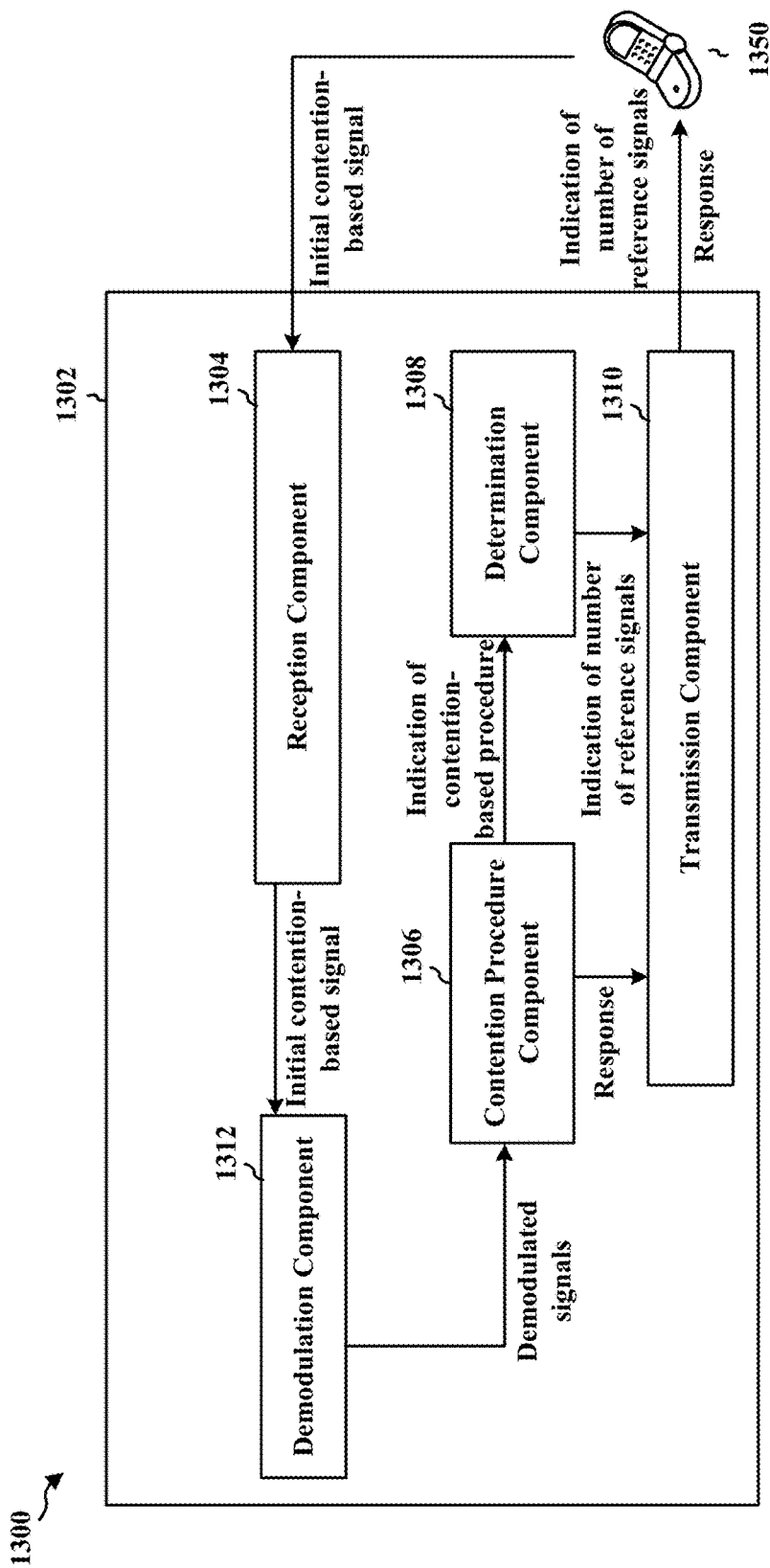
FIG. 13 is a conceptual data flow diagram illustrating the data flow between different means/components in an exemplary apparatus.

FIG. 13 is a conceptual data flow diagram 1300 illustrating the data flow between different means/components in an exemplary apparatus 1302. The apparatus may be a base station (e.g., the first base station 612, the first TRP 540, or another base station). The illustrated data flow is to be regarded as illustrative, and the apparatus 1302 may include additional/other components and/or additional/other data flow.

The apparatus 1302 may include a reception component 1304 configured to receive signals from a UE, such as the UE 1350. The apparatus 1302 may include a transmission component 1310 configured to transmit signals to a UE, such as the UE 1350.

The apparatus 1302 may include a determination component 1308. The determination component may receive, from a contention procedure component 1306, an indication that a contention-based procedure is to be performed with the UE 1350. The determination component 1308 may determine to that at least two RSs are to be used for the initial contention-based procedure. The determination component 1308 may provide, to the transmission component 1310, an indication to use at least two RSs based on the determination to use at least two RSs.

In one aspect, the determination component 1308 may determine that at least two RSs are to be used for the initial contention-based procedure based on one or more operating conditions associated with a network associated with the apparatus 1302. For example, the determination component 1308 may determine a number of UEs within a zone or coverage area associated with the UE 1350. In another example, the determination component 1308 may detect energy on resources. In another example, the determination component 1308 may detect interference associated with signals received by the reception component 1304 (e.g., SNR, SINR, etc.). Based on the one or more determined operating conditions, the determination component 1308 may determine that at least two RSs are to be used for the initial contention-based procedure.

The determination component 1308 may cause the transmission component 1310 to transmit an indication that at least two RSs are to be used for the initial contention-based procedure. In one aspect, the determination component 1308 may include the indication in a SIB, which may be broadcast by the transmission component 1310.

The reception component 1304 may receive, from the UE 1350, an initial contention-based signal. The initial contention-based signal may be carried on a PUMICH or a PRACH. The reception component 1304 may provide the initial contention-based signal to a demodulation component 1312.

The initial contention-based signal may include at least two RSs and a payload. The demodulation component 1312 may be configured to demodulate the payload based on at least a first RS of the at least two RSs or a second RS of the at least two RSs. In one aspect, the at least two RSs are TDM in the initial contention-based signal. In another aspect, the at least two RSs are FDM in the initial contention-based signal. The demodulation component 1312 may first attempt to demodulate the payload using a first RS of the at least two RSs. If the demodulation component 1312 successfully demodulates the payload using the first RS, the demodulation component 1312 may refrain from attempting to demodulate the payload using the second RS. However, if the demodulation component 1312 fails to demodulate the payload using the first RS (e.g., due to collision of the first RS), then the demodulation component 1312 may attempt to demodulate the payload using the second RS of the at least two RSs. If the demodulation component 1312 succeeds in demodulating the payload using at least one of the at least two RSs, the demodulation component 1312 may provide the demodulated payload and/or at least one of the at least two RSs to the contention procedure component 1306.

In one aspect, the first RS may include a first RACH preamble and the second RS may include a second RACH preamble. In an aspect, the payload may include at least one of an ID associated with the UE 1350, an SR, a BSR, and/or a bitmap associated with a request for at least one SIB. Based at least on the initial contention-based signal, the contention procedure component 1306 may be configured to determine a response, which may be associated with a contention-based procedure. In one aspect, the contention procedure component 1306 may determine a SIB that is based on a bitmap included in the payload. The contention procedure component 1306 may generate at least one SIB based on the bitmap.

In one aspect, the contention procedure component 1306 may determine at least one of a TA, a contention-resolution message, a transmit power control, a backoff indicator, or a detected RACH preamble ID or RACH mid-amble ID (e.g., associated with at least one of the two RSs). The contention procedure component 1306 may generate a response that includes the determined at least one of the TA, contention-resolution message, the transmit power control, the backoff indicator, or the detected RACH preamble ID and/or RACH mid-amble ID.

The contention procedure component 1306 may provide the response to the transmission component 1310. The transmission component 1310 may transmit the response to the UE 1350, for example, on a PDSCH, PDCCH, or PKACH.

The apparatus may include additional components that perform each of the blocks of the algorithm in the aforementioned flowcharts of FIG. 10. As such, each block in the aforementioned flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 14:
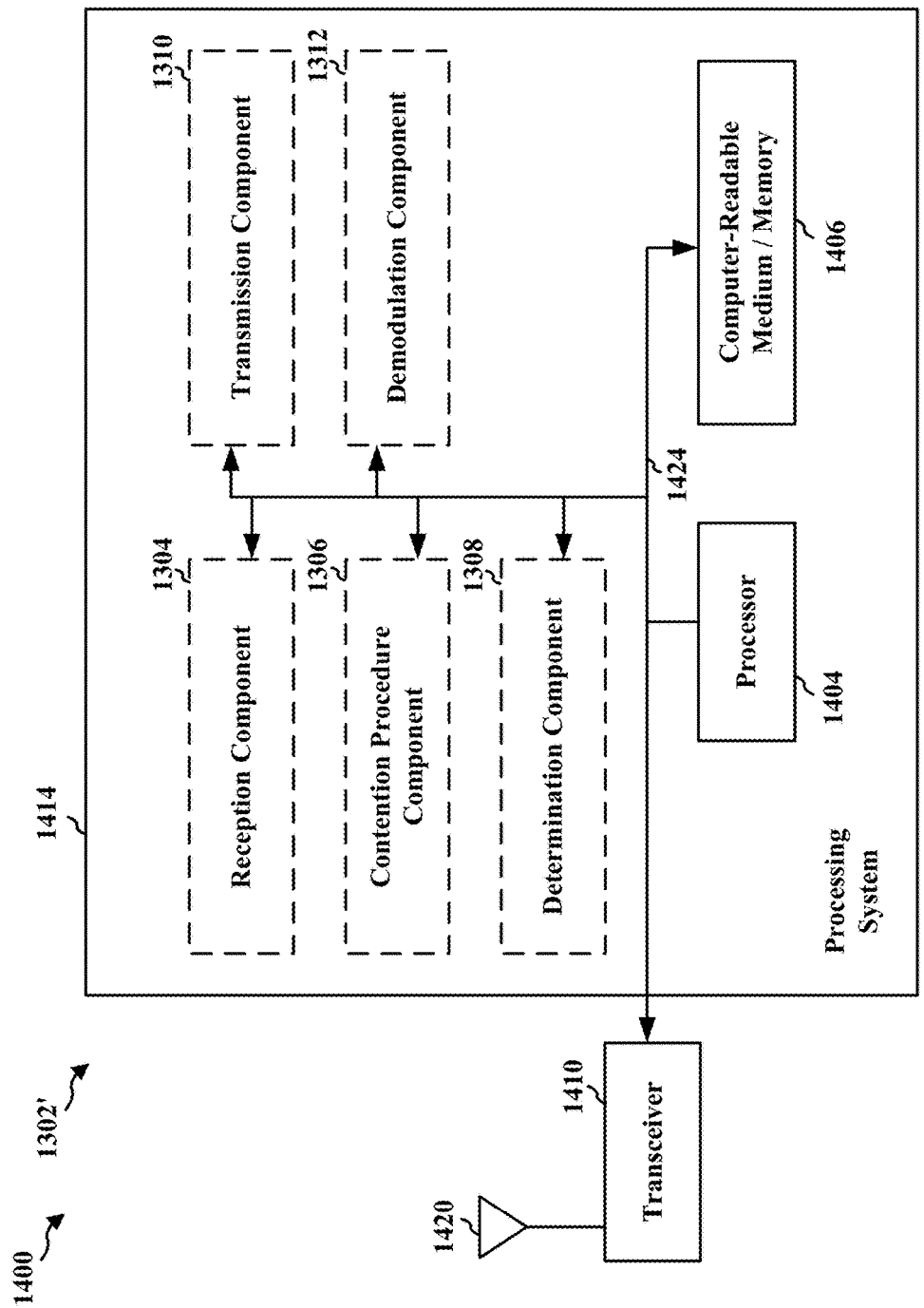
FIG. 14 is a diagram illustrating an example of a hardware implementation for an apparatus employing a processing system.

FIG. 14 is a diagram 1400 illustrating an example of a hardware implementation for an apparatus 1302' employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1304, 1306, 1308, 1310, 1312 and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1304. In addition, the transceiver 1410 receives information from the processing system 1414, specifically the transmission component 1310, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1304, 1306, 1308, 1310, 1312. The components may be software components running in the processor 1404, resident/stored in the computer readable medium/memory 1406, one or more hardware components coupled to the processor 1404, or some combination thereof. The processing system 1414 may be a component of the base station 310 and may include the memory 376 and/or at least one of the TX processor 316, the RX processor 370, and the controller/processor 375.

In one configuration, the apparatus 1302/1302' for wireless communication includes means for receiving, from a UE, an initial contention-based signal that includes at least two reference signals and a payload. The apparatus 1302/1302' may include means for demodulating the payload based on a first reference signal of the at least two reference signals or a second reference signal of the at least two reference signals.

In an aspect, the first reference signal comprises a first RACH preamble and the second reference signal comprises a second RACH preamble. In an aspect, the initial contention-based signal is carried on a PUMICH or a PRACH. In an aspect, the at least two reference signals are time-division multiplexed in the initial contention-based signal. In an aspect, the at least two reference signals are frequency-division multiplexed in the initial contention-based signal.

The apparatus 1302/1302' may further include means for transmitting, to the UE, an indication to use the at least two reference signals. The apparatus 1302/1302' may further include means for transmitting, to the UE, a response based on the initial contention-based signal.

In an aspect, the response comprises at least one SIB that is based on a bitmap included in the payload. In an aspect, the response includes at least one of a TA, a contention-resolution message, a transmit power control, a backoff indicator, or a detected RACH preamble ID. In an aspect, the response is carried on a PDSCH, a PDCCH, or a PKACH. In an aspect, the payload includes at least one of an ID associated with the UE, a BSR, an SR, or a bitmap associated with a request for a SIB.

The aforementioned means may be one or more of the aforementioned components of the apparatus 1302 and/or the processing system 1414 of the apparatus 1302' configured to perform the functions recited by the aforementioned means. As described supra, the processing system 1414 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," or the like may not be a substitute for the word "means." As such, no claim element is to be construed as a means plus function unless the element is expressly recited using the phrase "means for."

What is claimed is:

1. A method of wireless communication by a user equipment (UE), the method comprising:
   receiving, from a network, an indication to include at least two reference signals in a contention-based procedure;
   determining the at least two reference signals from at least a first pool associated with available reference signals; and
   transmitting an initial contention-based signal that includes the at least two reference signals and a payload, wherein the payload can be demodulated based on a first reference signal of the at least two reference signals and can be demodulated based on a second reference signal of the at least two reference signal.

2. The method of claim 1, wherein both the first reference signal and the second reference signal are determined from the first pool.

3. The method of claim 1, wherein the first reference signal is determined from the first pool and the second reference signal is determined from a second pool associated with available reference signals.

4. The method of claim 1, wherein the first reference signal comprises a first random access channel (RACH) preamble and the second reference signal comprises a second RACH preamble, and wherein the first pool comprises a plurality of preamble sequences.

5. The method of claim 1, wherein the initial contention-based signal is carried on a Physical Uplink Measurement Indication Channel (PUMICH) or a physical RACH (PRACH).

6. The method of claim 1, wherein the at least two reference signals are time-division multiplexed in the initial contention-based signal.

7. The method of claim 6, wherein the at least two time-division multiplexed reference signals have a first numerology and the payload has a second numerology, and wherein numerology refers to subcarrier spacing in the initial contention-based signal.

8. The method of claim 7, wherein the first numerology is equal to the second numerology or the first numerology is different from the second numerology.

9. The method of claim 1, wherein the at least two reference signals are frequency-division multiplexed in the initial contention-based signal.

10. The method of claim 9, wherein a first comb associated with first reference signal is interleaved with a second comb associated with the second reference signal.

11. The method of claim 1, further comprising:
determining to use the at least two reference signals for the initial contention-based signal.

12. The method of claim 11, wherein the determining to use the at least two reference signals is based on one or more operating conditions associated with the network.

13. The method of claim 1, further comprising:
receiving a response based on the initial contention-based signal.

14. The method of claim 1, wherein the payload includes at least one of an identifier (ID) associated with the UE, a scheduling request (SR), a buffer status report (BSR), or a bitmap associated with a request for at least one system information block (SIB).

15. A method of wireless communication by a network system, the method comprising:
transmitting, to a user equipment (UE), an indication to use at least two reference signals for a contention-based procedure;
receiving, from the UE, an initial contention-based signal that includes at least two reference signals and a payload; and
demodulating the payload based on a first reference signal of the at least two reference signals or a second reference signal of the at least two reference signals.

16. The method of claim 15, wherein the first reference signal comprises a first random access channel (RACH) preamble and the second reference signal comprises a second RACH preamble.

17. The method of claim 15, wherein the initial contention-based signal is carried on a Physical Uplink Measurement Indication Channel (PUMICH) or a physical RACH (PRACH).

18. The method of claim 15, wherein the at least two reference signals are time-division multiplexed in the initial contention-based signal.

19. The method of claim 15, wherein the at least two reference signals are frequency-division multiplexed in the initial contention-based signal.

20. The method of claim 15, further comprising:
transmitting, to the UE, a response based on the initial contention-based signal.

21. The method of claim 20, wherein the response comprises at least one system information block (SIB) that is based on a bitmap included in the payload.

22. The method of claim 20, wherein the response includes at least one of a timing advance (TA), a contention-resolution message, a transmit power control, a backoff indicator, or a detected RACH preamble identifier (ID).

23. The method of claim 20, wherein the response is carried on a physical downlink shared channel (PDSCH), a physical downlink control channel (PDCCH), or a physical keep-alive channel (PKACH).

24. The method of claim 15, wherein the payload includes at least one of an identifier (ID) associated with the UE, a buffer status report (BSR), a scheduling request (SR), or a bitmap associated with a request for a system information block (SIB).

25. A user equipment (UE), the UE comprising:
a memory; and
at least one processor coupled to the memory and configured to:
receive, from a network, an indication to include at least two reference signals in a contention-based procedure;
determine the at least two reference signals from at least a first pool associated with available reference signals; and
transmit an initial contention-based signal that includes the at least two reference signals and a payload, wherein the payload can be demodulated based on a first reference signal of the at least two reference signals and can be demodulated based on a second reference signal of the at least two reference signals.

26. The UE of claim 25, wherein both the first reference signal and the second reference signal are determined from the first pool.

27. An apparatus, the apparatus comprising:
a memory; and
at least one processor coupled to the memory and configured to:
transmit, to a user equipment (UE), an indication to use at least two reference signals for a contention-based procedure;
receive, from the UE, an initial contention-based signal that includes at least two reference signals and a payload; and
demodulate the payload based on a first reference signal of the at least two reference signals or a second reference signal of the at least two reference signals.

28. The apparatus of claim 27, wherein the first reference signal comprises a first random access channel (RACH) preamble and the second reference comprises a second RACH preamble.

* * * * *